(12) United States Patent
Shiohara et al.

(10) Patent No.: US 10,402,139 B2
(45) Date of Patent: Sep. 3, 2019

(54) INFORMATION PROCESSING APPARATUS THAT GENERATES PRINT FUNCTION INFORMATION, AND RELATED CONTROL METHOD AND STORAGE MEDIUM STORING PROGRAM

(71) Applicant: CANON KABUSHIKI KAISHA, Tokyo (JP)

(72) Inventors: Tetsuya Shiohara, Sagamihara (JP); Yasuo Kurata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/906,528

(22) Filed: Feb. 27, 2018

(65) Prior Publication Data

US 2018/0260181 A1 Sep. 13, 2018

(30) Foreign Application Priority Data

Mar. 9, 2017 (JP) ................................ 2017-045255

(51) Int. Cl.
*G06F 3/12* (2006.01)
(52) U.S. Cl.
CPC .......... *G06F 3/1296* (2013.01); *G06F 3/1205* (2013.01); *G06F 3/1232* (2013.01); *G06F 3/1253* (2013.01); *G06F 3/1297* (2013.01)
(58) Field of Classification Search
None
See application file for complete search history.

(56) References Cited

U.S. PATENT DOCUMENTS

2008/0297840 A1* 12/2008 Miyata ................ G06F 3/1204
358/1.15
2014/0293312 A1* 10/2014 Fukasawa .......... G06K 15/1806
358/1.13

FOREIGN PATENT DOCUMENTS

JP 2004-157611 A 6/2004

* cited by examiner

*Primary Examiner* — Henok Shiferaw
(74) *Attorney, Agent, or Firm* — Venable LLP

(57) ABSTRACT

An information processing apparatus obtains a print setting definition file of a printer driver, and an additional function from a printing apparatus. In addition, the apparatus generates print function information in which a setting item, a first additional item, and a second additional item are described. In a case in which one additional function, as the additional function, is obtained, the print function information is generated so that information regarding the one additional function is described in the first additional item, and an attribute indicating non-display is described in the second additional item. In a case in which the first additional function and a second additional function, as the additional function, are obtained, the print function information is generated so that information regarding the first additional function is described in the first additional item, and information regarding the second additional function is described in the second additional item.

19 Claims, 25 Drawing Sheets

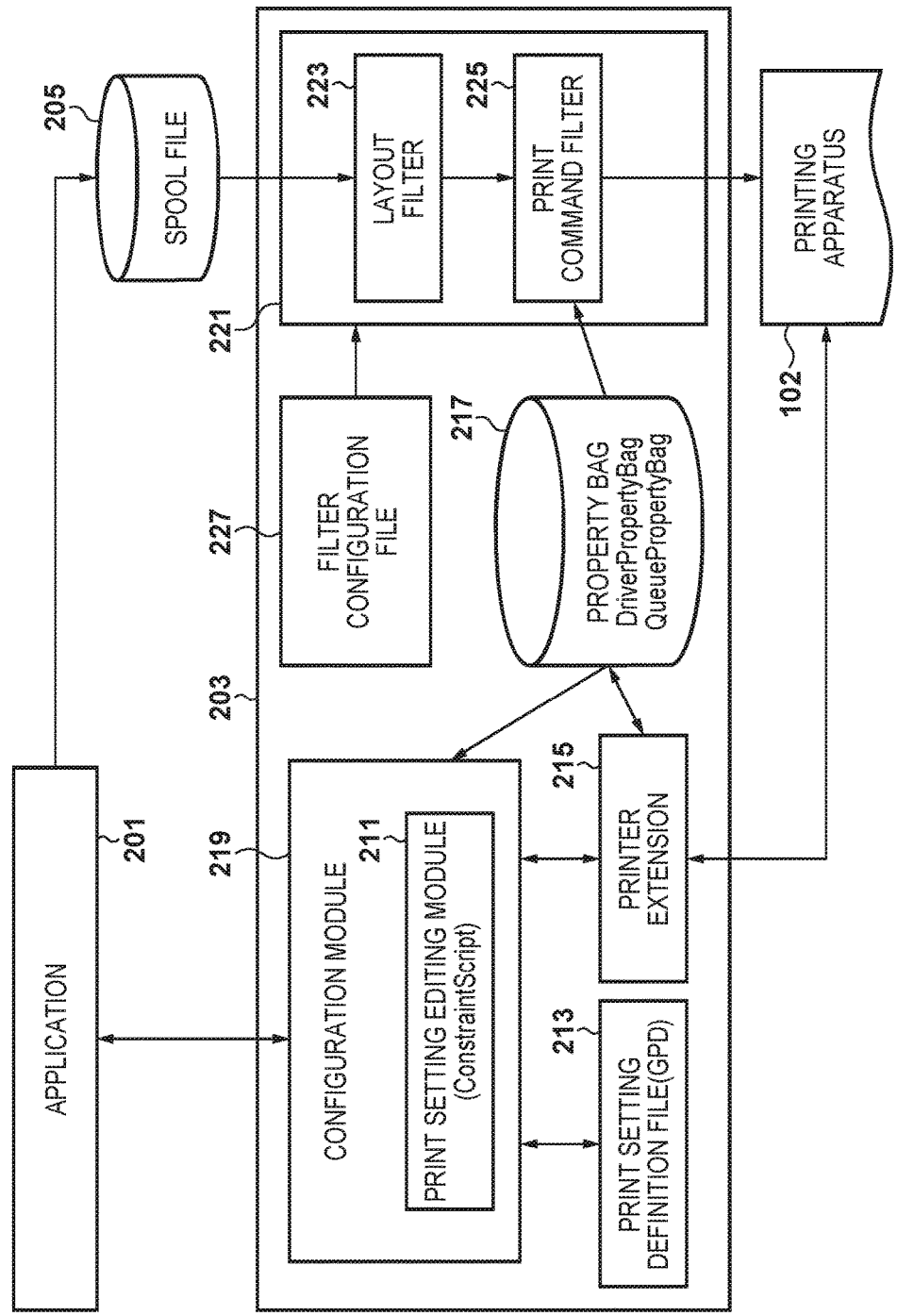

FIG. 3

```
*Feature:MediaType
{
    *rcNameID:=MEDIA_TYPE_DISPLAY
    *DefaultOption:Plain

*Option:Plain
    {
        *rcNameID:=PLAIN_PAPER_DISPLAY
    }
    *Option:Glossy
    {
        *rcNameID:=GLOSSY_PAPER_DISPLAY
    }
}
*Feature:PageOutputQuality
{
    *rcNameID:=MEDIA_TYPE_DISPLAY
    *PrintSchemaKeywordMap:"PageOutputQuality"
    *DefaultOption:Normal

*Option:High
    {
        *PrintSchemaKeywordMap:"High"
        *rcNameID:=ID_QUALITY_HIGH
    }
    *Option:Normal
    {
        *PrintSchemaKeywordMap:"Normal"
        *rcNameID:=ID_QUALITY_NORMAL
    }
    *Option:Draft
    {
        *PrintSchemaKeywordMap:"Draft"
        *rcNameID:=ID_QUALITY_DRAFT
    }
}
*InvalidCombination:LIST(MediaType.GlossyPaper,PageOutputQuality.Draft)
```

FIG. 4

```xml
<psf:Feature name="psk:PageMediaType">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Media Type</psf:Value>
    </psf:Property>
    <psf:Option name="psk:Plain"constrained="psk:None">
        <psf:Property name="psk:DisplayName">
            <psf:Value xsi:type="xsd:string">Plain Paper</psf:Value>
        </psf:Property>
    </psf:Option>
    <psf:Option name="ns0000:Glossy"constrained="psk:None">
        <psf:Property name="psk:DisplayName">
            <psf:Value xsi:type="xsd:string">Glossy Paper</psf:Value>
        </psf:Property>
    </psf:Option>
</psf:Feature>
<psf:Feature name="psk:PageOutputQuality">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Print Quality</psf:Value>
    </psf:Property>
    <psf:Option name="psk:High"constrained="psk:None">
        <psf:Property name="psk:DisplayName">
            <psf:Value xsi:type="xsd:string">High</psf:Value>
        </psf:Property>
    </psf:Option>
    <psf:Option name="psk:Normal"constrained="psk:None">
        <psf:Property name="psk:DisplayName">
            <psf:Value xsi:type="xsd:string">Standard</psf:Value>
        </psf:Property>
    </psf:Option>
    <psf:Option name="psk:Draft"constrained="psk:PrintTicketSettings">
        <psf:Property name="psk:DisplayName">
            <psf:Value xsi:type="xsd:string">Draft</psf:Value>
        </psf:Property>
    </psf:Option>
</psf:Feature>
```

FIG. 5

```
<psf:Feature name="psk:PageMediaType">
    <psf:Option name="psk:Plain">
</psf:Feature>
<psf:Feature name="psk:PageOutputQuality">
    <psf:Option name="psk:Normal">
</psf:Feature>
```

FIG. 6

```
*Feature:MediaType
{
    *rcNameID:=MEDIA_TYPE_DISPLAY
    *DefaultOption:Plain

*Option:Plain
    {
        *rcNameID:=PLAIN_PAPER_DISPLAY
    }
    *Option:PhotoPaperGlossy
    {
        *rcNameID:=GLOSSY_PAPER_DISPLAY
    }
    *Option:AddMedia1
    {
        *Name:"AddMedia1"
    }
    *Option:AddMedia2
    {
        *Name:"AddMedia2"
    }
    *Option:AddMedia3
    {
        *Name:"AddMedia3"
    }
}
```

FIG. 7

| Key | Value |
|---|---|
| MediaList | {"Plain,Glossy"} |
| AddMedia1 | |
| AddMedia2 | |
| AddMedia3 | |

F I G. 12

| Key | Value |
|---|---|
| MediaList | {"Plain,Glossy"} |
| AddMedia1 | {"DisplayName":"Coated Paper","PageOutputQuality":"Draft,Normal","Command":"0x001"} |
| AddMedia2 | {"DisplayName":"Glossy Paper2","PageOutputQuality":"Normal,High","Command":"0x002"} |
| AddMedia3 | |

FIG. 15

```xml
<psf:Feature name="psk:PageMediaType">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Media Type</psf:Value>
    </psf:Property>
    <psf:Option name="psk:Plain"constrained="psk:None">
        <psf:Property name="psk:DisplayName">
            <psf:Value xsi:type="xsd:string">Plain Paper</psf:Value>
        </psf:Property>
    </psf:Option>
    <psf:Option name="ns0000:Glossy"constrained="psk:None">
        <psf:Property name="psk:DisplayName">
            <psf:Value xsi:type="xsd:string">Glossy Paper</psf:Value>
        </psf:Property>
    </psf:Option>
    <psf:Option name="ns0000:AddMedia1"constrained="psk:None">
        <psf:Property name="psk:DisplayName">
            <psf:Value xsi:type="xsd:string">Coated Paper</psf:Value>
        </psf:Property>
    </psf:Option>
    <psf:Option name="ns0000:AddMedia2"constrained="psk:None">
        <psf:Property name="psk:DisplayName">
            <psf:Value xsi:type="xsd:string">Glossy Paper2</psf:Value>
        </psf:Property>
    </psf:Option>
</psf:Feature>
<psf:Feature name="psk:PageOutputQuality">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Print Quality</psf:Value>
    </psf:Property>
    <psf:Option name="psk:High"constrained="None">
        <psf:Property name="psk:DisplayName">
            <psf:Value xsi:type="xsd:string">High</psf:Value>
        </psf:Property>
    </psf:Option>
    <psf:Option name="psk:Normal"constrained="psk:None">
        <psf:Property name="psk:DisplayName">
            <psf:Value xsi:type="xsd:string">Standard</psf:Value>
        </psf:Property>
    </psf:Option>
    <psf:Option name="psk:Draft"constrained="psk:PrintTicketSetting">
        <psf:Property name="psk:DisplayName">
            <psf:Value xsi:type="xsd:string">Draft</psf:Value>
        </psf:Property>
    </psf:Option>
</psf:Feature>
```

```
<psf:Feature name="psk:PageMediaType">
    <psf:Option name="ns0000:AddMedia2">
    </psf:Option>
</psf:Feature>
<psf:Feature name="psk:PageOutputQuality">
    <psf:Option name="psk:Normal">
    </psf:Option>
</psf:Feature>
<psf:Property name="ns0000:AddMediaCommand">
    <psf:Value xsi:type="xsd:string">0xF001</psf:Value>
</psf:Property>
```

F I G. 18A

```xml
<psf:Feature name="psk:PageMediaSize">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Page Size</psf:Value>
    </psf:Property>
    <psf:Option name="psk:NorthAmericaLetter" constrained="psk:None">
        <psf:Property name="psk:DisplayName">
            <psf:Value xsi:type="xsd:string">Letter</psf:Value>
        </psf:Property>
        <psf:ScoredProperty name="psk:MediaSizeWidth">
            <psf:Value xsi:type="xsd:integer">215900</psf:Value>
        </psf:ScoredProperty>
        <psf:ScoredProperty name="psk:MediaSizeHeight">
            <psf:Value xsi:type="xsd:integer">279400</psf:Value>
        </psf:ScoredProperty>
    </psf:Option>
    <psf:Option name="psk:ISOA4" constrained="psk:None">
        <psf:Property name="psk:DisplayName">
            <psf:Value xsi:type="xsd:string">A4</psf:Value>
        </psf:Property>
        <psf:ScoredProperty name="psk:MediaSizeWidth">
            <psf:Value xsi:type="xsd:integer">210000</psf:Value>
        </psf:ScoredProperty>
        <psf:ScoredProperty name="psk:MediaSizeHeight">
            <psf:Value xsi:type="xsd:integer">297000</psf:Value>
        </psf:ScoredProperty>
    </psf:Option>
    <psf:Option name="psk:UserForm0001" constrained="psk:None">
        <psf:Property name="psk:DisplayName">
            <psf:Value xsi:type="xsd:string">UserSize1</psf:Value>
        </psf:Property>
        <psf:ScoredProperty name="psk:MediaSizeWidth">
            <psf:Value xsi:type="xsd:integer">200000</psf:Value>
        </psf:ScoredProperty>
        <psf:ScoredProperty name="psk:MediaSizeHeight">
            <psf:Value xsi:type="xsd:integer">250000</psf:Value>
        </psf:ScoredProperty>
    </psf:Option>
    <psf:Option name="psk:UserForm0002" constrained="psk:None">
        <psf:Property name="psk:DisplayName">
            <psf:Value xsi:type="xsd:string">UserSize2</psf:Value>
        </psf:Property>
        <psf:ScoredProperty name="psk:MediaSizeWidth">
            <psf:Value xsi:type="xsd:integer">150000</psf:Value>
        </psf:ScoredProperty>
        <psf:ScoredProperty name="psk:MediaSizeHeight">
            <psf:Value xsi:type="xsd:integer">170000</psf:Value>
        </psf:ScoredProperty>
    </psf:Option>
</psf:Feature>
```

F I G. 18B

```xml
<psf:Feature name="ns0000:PageOutputMediaSize">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Printer Paper Size</psf:Value>
    </psf:Property>
    <psf:Option name="ns0000:NorthAmericaLetter"constrained="psk:None">
        <psf:Property name="psk:DisplayName">
            <psf:Value xsi:type="xsd:string">Letter</psf:Value>
        </psf:Property>
        <psf:ScoredProperty name="psk:MediaSizeWidth">
            <psf:Value xsi:type="xsd:integer">215900</psf:Value>
        </psf:ScoredProperty>
        <psf:ScoredProperty name="psk:MediaSizeHeight">
            <psf:Value xsi:type="xsd:integer">279400</psf:Value>
        </psf:ScoredProperty>
    </psf:Option>
    <psf:Option name="ns0000:ISOA4"constrained="psk:None">
        <psf:Property name="psk:DisplayName">
            <psf:Value xsi:type="xsd:string">A4</psf:Value>
        </psf:Property>
        <psf:ScoredProperty name="psk:MediaSizeWidth">
            <psf:Value xsi:type="xsd:integer">210000</psf:Value>
        </psf:ScoredProperty>
        <psf:ScoredProperty name="psk:MediaSizeHeight">
            <psf:Value xsi:type="xsd:integer">2970000</psf:Value>
        </psf:ScoredProperty>
    </psf:Option>
</psf:Feature>
```

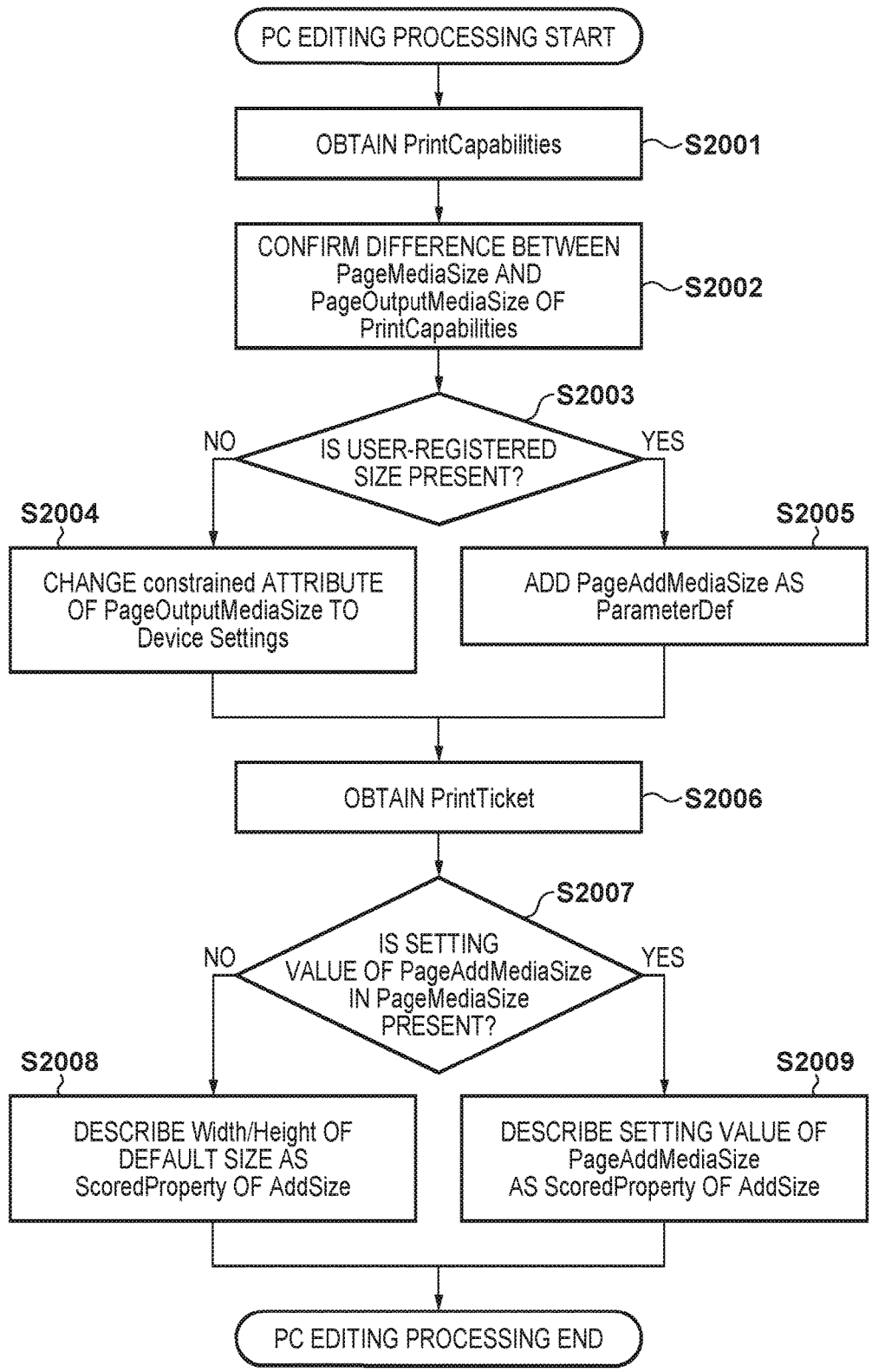

FIG. 21A

```xml
<psf:Feature name="ns0000:PageOutputMediaSize">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Printer Paper Size</psf:Value>
    </psf:Property>
    <psf:Option name="ns0000:NorthAmericaLetter"constrained="psk:None">
        <psf:Property name="psk:DisplayName">
            <psf:Value xsi:type="xsd:string">Letter</psf:Value>
        </psf:Property>
        <psf:ScoredProperty name="psk:MediaSizeWidth">
            <psf:Value xsi:type="xsd:integer">215900</psf:Value>
        </psf:ScoredProperty>
        <psf:ScoredProperty name="psk:MediaSizeHeight">
            <psf:Value xsi:type="xsd:integer">279400</psf:Value>
        </psf:ScoredProperty>
    </psf:Option>
    <psf:Option name="ns0000:ISOA4"constrained="psk:None">
        <psf:Property name="psk:DisplayName">
            <psf:Value xsi:type="xsd:string">A4</psf:Value>
        </psf:Property>
        <psf:ScoredProperty name="psk:MediaSizeWidth">
            <psf:Value xsi:type="xsd:integer">210000</psf:Value>
        </psf:ScoredProperty>
        <psf:ScoredProperty name="psk:MediaSizeHeight">
            <psf:Value xsi:type="xsd:integer">297000</psf:Value>
        </psf:ScoredProperty>
    </psf:Option>
    <psf:Option name="ns0000:AddSize"constrained="psk:None">
        <psf:Property name="psk:DisplayName">
            <psf:Value xsi:type="xsd:string">UserSize1</psf:Value>
        </psf:Property>
        <psf:ScoredProperty name="psk:MediaSizeWidth">
            <psf:Value xsi:type="xsd:integer">200000</psf:Value>
        </psf:ScoredProperty>
        <psf:ScoredProperty name="psk:MediaSizeHeight">
            <psf:Value xsi:type="xsd:integer">250000</psf:Value>
        </psf:ScoredProperty>
    </psf:Option>
</psf:Feature>
```

FIG. 21B

```
<psf:ParameterDef name="ns0000:PageAddMediaSize">
    <psf:Property name="psf:DisplayName">
        <psf:Value xsi:type="xsd:string">PagrAddMediaSize</psf:Value>
    </psf:Property>
    <psf:Property name="psk:DataType">
        <psf:Value xsi:type="xsd:QName">xsd:string</psf:Value>
    </psf:Property>
    <psf:Property name="psf:MaxLength">
        <psf:Value xsi:type="xsd:integer">32</psf:Value>
    </psf:Property>
    <psf:Property name="psf:MinLength">
        <psf:Value xsi:type="xsd:integer">1</psf:Value>
    </psf:Property>
    <psf:Property name="psf:DefaultValue">
        <psf:Value xsi:type="xsd:string">underfined</psf:Value>
    </psf:Property>
    <psf:Property name="psf:Mandatory">
        <psf:Value xsi:type="xsd:QName">psk:Conditional</psf:Value>
    </psf:Property>
    <psf:Property name="psf:UnitType">
        <psf:Value xsi:type="xsd:string">characters</psf:Value>
    </psf:Property>
</psf:ParameterDef>
```

INFORMATION PROCESSING APPARATUS THAT GENERATES PRINT FUNCTION INFORMATION, AND RELATED CONTROL METHOD AND STORAGE MEDIUM STORING PROGRAM

This application claims the benefit of Japanese Patent Application No. 2017-045255, filed Mar. 9, 2017, which is incorporated by reference herein in its entirety.

BACKGROUND OF THE INVENTION

Field of the Invention

This invention relates to an information processing apparatus having a printer driver, a control method, and a storage medium storing a program.

Description of the Related Art

There are print systems that use a computing device on which Microsoft® Windows® is installed as an operating system (OS). In those print systems, print data that has been generated by an application program (application), or the like, is stored in a spool file in an OS standard data format. The OS calls a printer driver in order to print the print data. Then, the printer driver reads print data stored in the spool file, generates a print image by an image generation processing unit, and, furthermore, performs a conversion into a print command that the printer can interpret. Print processing is executed by the print command being transmitted to the printer, and the printer interpreting the print command and forming an image on a print medium.

The printer driver provides settable functions to the application and selectable setting values for each function, and the application performs a print setting based on the provided information. The print settings that can be set by the printer driver are defined in the printer driver in advance. There is a desire to be able to add an item that can be later set with respect to a particular function, such as when it is desired that the printer driver be able to support a new medium that came out after the printer driver was generated. In relation to this, there exists an arrangement that makes it possible to make items that are selectable in a specific setting and parameter groups attached thereto to be independent from the printer driver, and to add selectable items later (Japanese Patent Laid-Open No. 2004-157611).

Also, in recent years, in Windows®, printer drivers that operate on a new architecture called a V4 printer driver are being introduced. A V4 printer driver is of an architecture that is a successor to the Extensible Markup Language (XML) Paper Specification (XPS) printer driver, which is provided as the architecture of the V3 printer driver, and it uses a print pass that uses an XPS document. In this XPS print pass, print function information, which is described in an XML format and is referred to as PrintCapabilities, and print setting information, which is described in an XML format and is referred to as a PrintTicket, are used to decide a format of a print material. The V4 printer driver is bundled with a print setting definition file, which is referred to as Generic Printer Description (GPD) and defines functions of print settings of the printer driver. A print setting change function that uses PrintCapabilities and PrintTicket can be provided to a user by installing a printer driver that includes this GPD on the OS.

In a V4 printer driver, based on a print setting definition file, a configuration module, which is provided by the OS, generates the print setting data, such as PrintCapabilities and PrintTicket. Accordingly, the configuration module determines that an item that is not described in the print setting definition file is an improper value and changes the setting. For this reason, there is a concern that print setting processing that the user desires will not be executed.

SUMMARY OF THE INVENTION

An aspect of the present invention is to eliminate the above-mentioned problems with the conventional technology. The present invention provides an arrangement wherein print setting processing that a user desires can be generated.

In one aspect, the present invention provides an information processing apparatus comprising an addition unit configured to add a setting item to a print setting definition file of a printer driver, a generation unit configured to generate print setting information based on the print setting definition file to which the setting item was added by the addition unit, and a reflection unit configured to reflect additional information as content of the added setting item to the print setting information generated by the generation unit.

According to the present invention, print setting processing that a user desires can be executed.

Further features of the present invention will become apparent from the following description of exemplary embodiments with reference to the attached drawings.

BRIEF DESCRIPTION OF THE DRAWINGS

FIG. 2 is a view that illustrates a block configuration of a driver printing system.

FIG. 3 is a view that illustrates a portion of a print setting definition file (i.e., a Printer Description) (GPD).

FIG. 4 is a view that illustrates PrintCapabilities.

FIG. 5 is a view that illustrates PrintTicket.

FIG. 6 is a view that illustrates a definition of MediaType.

FIG. 7 is a diagram that illustrates content of a QueuePropertyBag (QPB).

FIG. 12 is a view that illustrates a state of the QPB after the processing of FIG. 11.

FIG. 15 is a view that illustrates PrintCapabilities after the processing of FIG. 13.

FIGS. 18A and 18B are views that illustrates PrintCapabilities.

FIG. 20 is a flowchart that illustrates a PrintCapabilities generation process.

FIGS. 21A and 21B are views that illustrates PrintCapabilities after the processing of FIG. 20.

DESCRIPTION OF THE EMBODIMENTS

Figure 1:
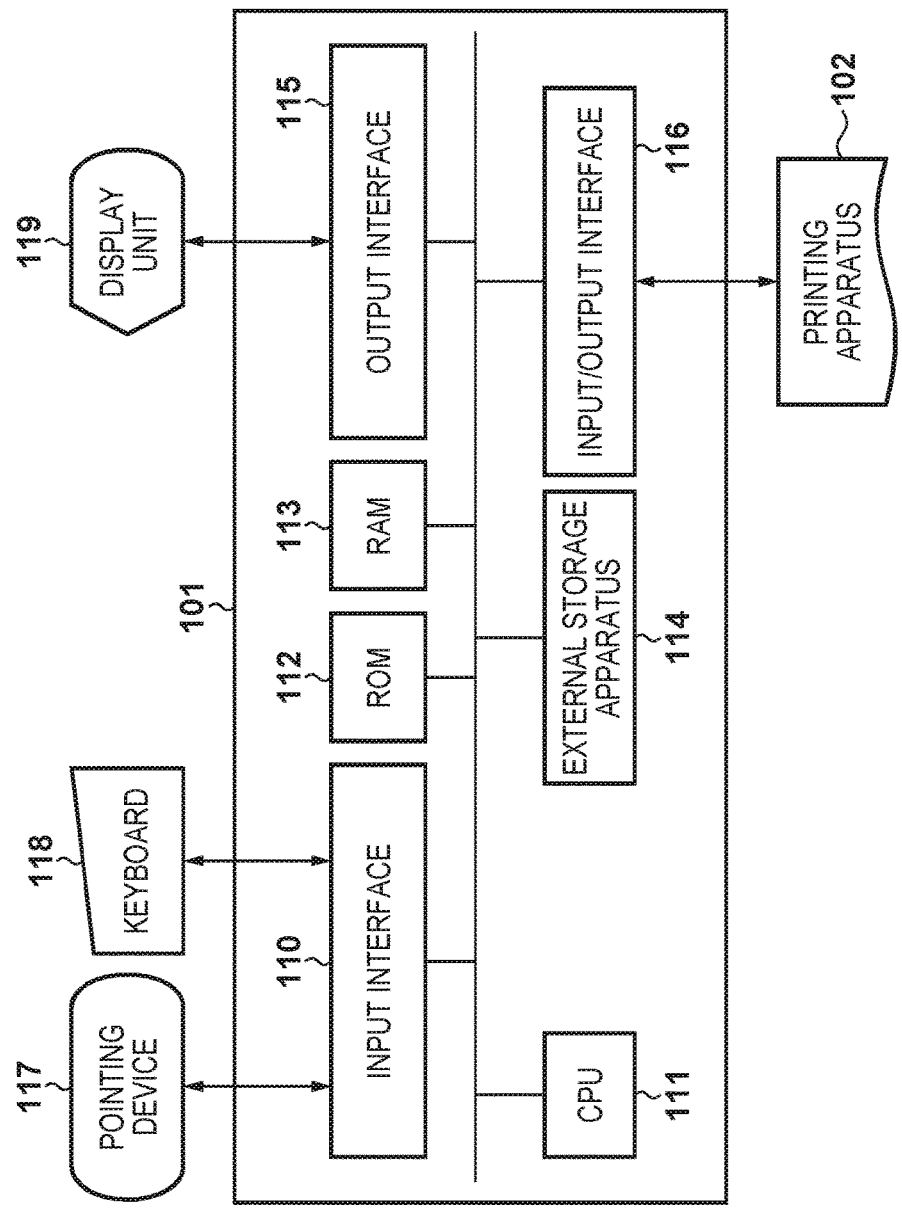
FIG. 1 is a block diagram that illustrates a hardware configuration of a print system.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

First Embodiment

FIG. 1 is a block diagram that illustrates a hardware configuration of a print system. In the present view, a host computer 101 is an example of an information processing apparatus and comprises an input interface 110, a central processing unit (CPU) 111, a read only memory (ROM) 112, a random-access memory (RAM) 113, an external storage apparatus 114, an output interface 115, and an input/output interface 116. Also, input devices, such as a keyboard 118 and a pointing device 117, are connected to the input interface 110, and a display device, such as a display unit 119, is connected to the output interface 115.

An initialization program is stored in the ROM 112 and a group of application programs, an OS, a printer driver 203, and other various data are stored in the external storage apparatus 114. For example, the RAM 113 is used as a work memory when various programs stored in the external storage apparatus 114 are executed. Note, in the present embodiment, later-described functions in the host computer 101 and processing according to later-described flowcharts are realized by the CPU 111 performing processing in accordance with a procedure of a program stored in the ROM 112. A printing apparatus 102 is connected with the host computer 101 via the input/output interface 116. Although the host computer 101 and the printing apparatus 102 are configured separately here, they may be configured as one information processing apparatus.

FIG. 2 is a block configuration diagram of a driver printing system. A driver printing system is a system that performs printing by using an XPS file format as spool data. The printer driver 203 can make a print instruction to the printing apparatus 102. The printer driver 203 comprises a configuration module 219 and a filter pipeline manager 221. These are positioned as modules of the printer driver 203, however, and are provided from the OS of the host computer 101.

The configuration module 219 generates a PrintTicket and a PrintCapabilities based on a print setting definition file 213. The print setting definition file 213 is a file of a text-based description called a Generic Printer Description (GPD). Also, a "prohibition" definition can be described in the print setting definition file 213. For example, based on a description method that Microsoft® defines, it is possible to provide a function that is prohibited in relation to the user by describing a setting value for print settings that cannot be set simultaneously in an InvalidCombination item. Here, "print settings that cannot be set simultaneously" encompasses not only things that cannot be provided as functions of the device, but also items that are desired to not be used by a user intentionally. Note, setting values set in each function (for example, sheet type and quality) correspond to items of the present embodiment.

Also, the configuration module 219 can edit print setting information using a print setting editing module 211 that the printer driver 203 provides. The print setting editing module 211 is a module called a ConstraintScript, that is described in the JavaScript® language. The print setting editing module 211 edits print setting information by using a property bag 217 in which data stored by the printer driver 203 is provided.

The property bag 217 indicates a region in which a data group called a DriverPropertyBag for use as printer model-dependent information and a data group called a QueuePropertyBag associated with a print queue are stored. DriverPropertyBag will be referred to as DPB and QueuePropertyBag will be referred to as QPB hereafter. A DPB and a QPB are save regions both provided by the OS. A DPB is printer model-dependent data present within a driver package, and a data group is stored as read-only in a specific region within the OS after installation of the printer driver 203. QPB can be used by registering an XML definition file of Key-Value pairs to the OS, and Values can be edited with a particular authority. Also, it is possible to describe a definition of a QPB in the GPD, which is the print setting definition file 213.

A printer extension 215 is a module in a V4 printer driver that provides a vendor-independent user interface for a user to perform print settings. The printer extension 215 provides a function for setting the sheet size, the print direction, and other attributes, to use in printing. At the same time, the printer extension 215 in the present embodiment has a function for obtaining information by communicating with the printing apparatus 102 and has a function for storing the obtained information to a QPB, as described previously.

In the print system in FIG. 2, in a case in which an application 201 performs a print job, first, generation of print setting information is performed. The application 201 calls the configuration module 219 of the printer driver 203 to generate and to store print setting information. Also, the application 201 can use the printer extension 215 in the generation of print setting information. The application 201 stores print setting information in the form of a DEVMODE structure or a PrintTicket.

Next, the application 201 performs generation of print data. Print data of each page of a document that is generated is temporarily stored in an XPS spool file 205 via a print support function of the OS. When the XPS spool file 205 is generated, processing is passed to the filter pipeline manager 221. The filter pipeline manager 221 is a mechanism in which a print is performed by passing through a plurality of filters, and the number and order of the filters is controlled by a filter configuration file 227. A filter group in the present embodiment is configured to include a layout filter 223, which is a layout processing unit, and a print command filter 225, which is a print command conversion unit.

The layout filter 223 has a function that takes, as input, an XPS document stored in the XPS spool file 205, performs page layout processing based on print setting information, and outputs XPS data for which laying out is completed.

Layout processing includes an allocation print, in which a plurality of pages are printed on one sheet surface, and a poster print, in which one page is printed on a plurality of sheet surfaces, for example.

The print command filter 225 has a function that takes, as input, the output of the layout filter 223, converts, in accordance with print setting information, the XPS document into a print command that the printing apparatus 102 can interpret, and outputs the result. In a case in which the print command filter 225 first converts an inputted XPS document into image data, the print command filter 225 is generally called a render filter. A render filter is often seen in printer drivers for low price raster printers as typified by an ink-jet printer. In a case in which the print command filter 225 operates as a render filter, it first converts an inputted XPS document into image data. After this, the image data is converted into a print command that the raster printer can interpret via an image processing process, such as a color space conversion, binarization, or the like. In a high-function printer as typified by a page printer, the print command filter 225 edits an inputted XPS document and outputs the XPS document in a case in which XPS is among the types of print commands that the printer can interpret. If processing by the print command filter 225 is not necessary, a configuration may be such that it outputs the inputted XPS document as is, or such that the print command filter 225 is not included in the printer driver 203.

FIG. 3 is a view that illustrates a portion of a print setting definition file (GPD). Note that, although only the type of sheet (PageMediaType) and the print quality (PageOutputQuality) are described here, functions supported by the printer driver 203 are described similarly. Functions (Feature) and items (Option) that can be selected for the functions are described in the GPD. For example, one example of a function is a sheet type, and examples of items are normal paper and glossy paper. Display names can be described for Feature and Option, respectively. A described display name is used as DisplayName in PrintCapabilities. As methods for describing a display name, there is a method of directly designating a title, and there is a method of designating an ID for associating a target string by using a resource file in which character string data is stored.

It is possible to describe a definition of a prohibition in the GPD as described above. The printer driver 203 can provide a prohibition function in relation to a user by describing setting values for print setting information that cannot be set simultaneously in an InvalidCombination item, as previously described. In the example of FIG. 3, a configuration is such that Draft of PageOutputQuality and GlossyPaper of PageMediaType cannot be set simultaneously. Also, a default option can be set in a Feature. Default options are initial values and are used as values to be changed to in the case of violation of a prohibition, as previously described.

FIG. 4 is a view illustrating an example of a PrintCapabilities generated based on the print setting definition file of FIG. 3. A PrintCapabilities is described in XML. In the generation of a PrintCapabilities, a PrintTicket is designated and capability information in the setting of the designated PrintTicket is represented. In correspondence with the Features and the Options defined in the print setting definition file, Features and Options are represented in a hierarchical structure in the PrintCapabilities as well.

Also, a DisplayName that indicates a display name is defined as a child element of each Option as a Property. Furthermore, a "constrained" attribute is described in each Option. The "constrained" attribute indicates whether a target Option is in a settable state. In a case of a settable state, "None" is set in the "constrained" attribute. "PrintTicketSettings", which indicates that setting is impossible because of conflict with another setting, is set in the "constrained" attribute in a case in which setting is impossible under a setting based on the designated PrintTicket, in accordance with a prohibition described in the print setting definition file. In addition, there is a setting value such as "DeviceSettings," which indicates that setting is not possible due to the current state of the device. The application 201 which uses the PrintCapabilities determines whether each Option can be set by referencing the "constrained" attribute when providing a setting screen for performing print settings. Then, the application 201 that uses the PrintCapabilities performs processing, such as graying out setting values or excluding setting values in the setting screen.

FIG. 5 is a view that illustrates an example of a PrintTicket. A PrintTicket is described in XML. The PrintTicket is generated based on a PrintCapabilities. In the PrintTicket, setting items (Option) are described for each function (Feature). Also, regarding functions that are not of a selection form, it is possible to set a numerical value or a character string as appropriate in the form of a Parameterinit or a Property.

Also, in a V4 printer driver, generation of a PrintTicket and verification of validity is performed by the previously described configuration module 219. Verification of validity is performed based on the print setting definition file 213. The configuration module 219, in a case in which a setting item that is not described in the print setting definition file 213 is set in the PrintTicket, treats the corresponding setting as an improper value and changes it to the default setting value of the corresponding function.

Hereafter, a description will be given for a method of adding a selectable setting value after generation of the printer driver 203 for a type of sheet (PageMediaType), which is one Feature of the printer driver 203, in the configuration of a driver printing system such as the above. Here, it is assumed that an upper limit on the number of setting values that can be added is decided in advance in the present embodiment.

FIG. 6 illustrates a definition of a MediaType in the print setting definition file (GPD) 213 that is used in the present embodiment. Compared to the print setting definition file (GPD) illustrated in FIG. 3, AddMedia1, AddMedia2, and AddMedia3 are defined as Options used for designating setting values to be added to the types of sheets (media) when they come out. As described above, in the present embodiment, an upper limit is decided in advance on the number of setting values that can be added, and here, the upper limit on the number of media that can be added is defined to be 3.

FIG. 7 is a view illustrating an example of the content of a QPB that is used in the present embodiment. As described above, a QPB is made up of Key-Value pairs, and FIG. 7 indicates an example of this.

In the QPB in the present embodiment, MediaList, AddMedia1, AddMedia2, and AddMedia3 are defined as Keys, and are registered in the OS. Furthermore, regarding MediaList, a value for Value is defined when generating the printer driver 203, and is registered in the OS.

Key:MediaList is provided with the objective of storing a list of media that is supported at the point in time of generation of the printer driver 203, and is referenced in later-described processing. As illustrated in FIG. 7, Option names of media that is supported at the time of generation of the printer driver 203 are enumerated. Regarding the Values for Key:AddMedia1, Key:AddMedia2, and Key:

AddMedia3, registration in the OS is of a form in which values are not present at a point in time when the printer driver 203 is generated.

Next, the configuration of the printing apparatus 102 in the present embodiment will be described.

Figure 8:
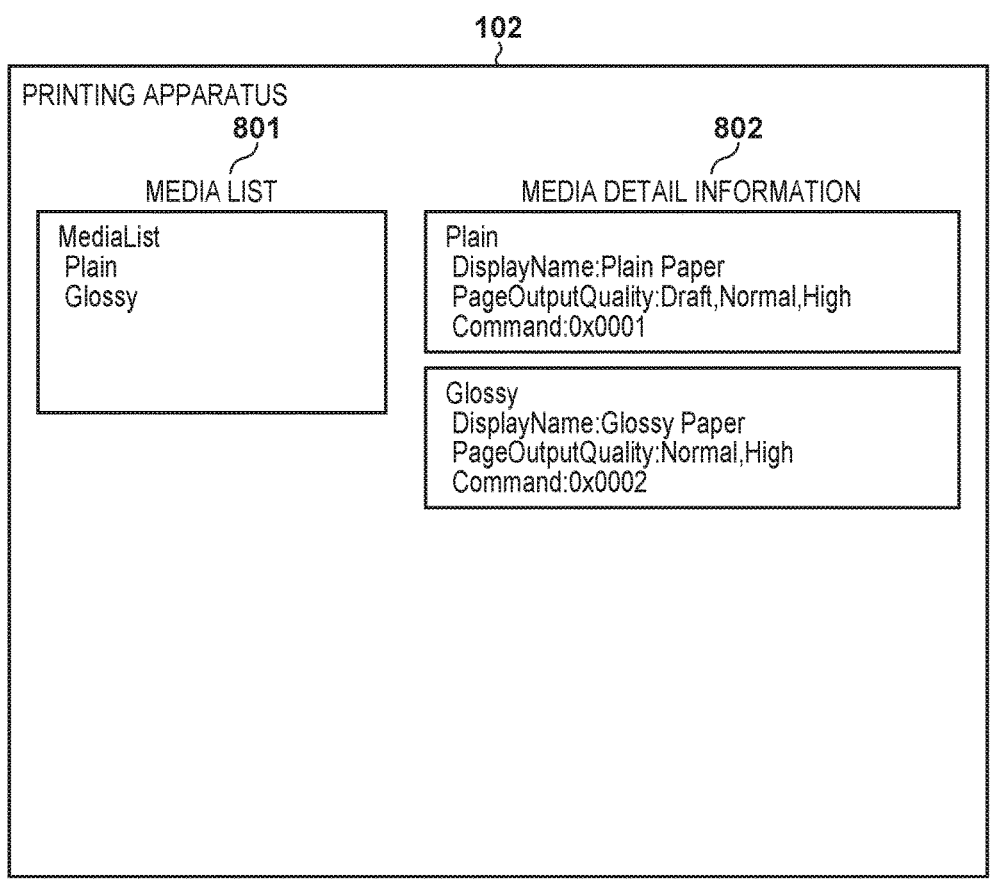
FIG. 8 is a view that illustrates information of media that is stored in a printing apparatus.

FIG. 8 illustrates information of supported media that is stored in the printing apparatus 102. Also, it is assumed that a state at the time of shipment is illustrated for the printing apparatus 102 of FIG. 8. The printing apparatus 102 stores a media list 801 in which supported media is enumerated. In the media list 801 for the time of shipping of the printer, two items, Plain and Glossy, are enumerated. Furthermore, the printing apparatus 102 stores media detail information 802 corresponding to each media item enumerated in the media list 801. In the media detail information 802, a title (DisplayName) for each type of media and print qualities (PageOutputQuality) supported for each type of media are included. Also, in the media detail information 802, a print command (Command) used when designating each type of media in a print job is included.

Next, description will be given of an example in which a new type of media comes out after shipment of the printing apparatus 102 and the new type of media is added to the media that can be used in the printing apparatus 102.

Figure 9:
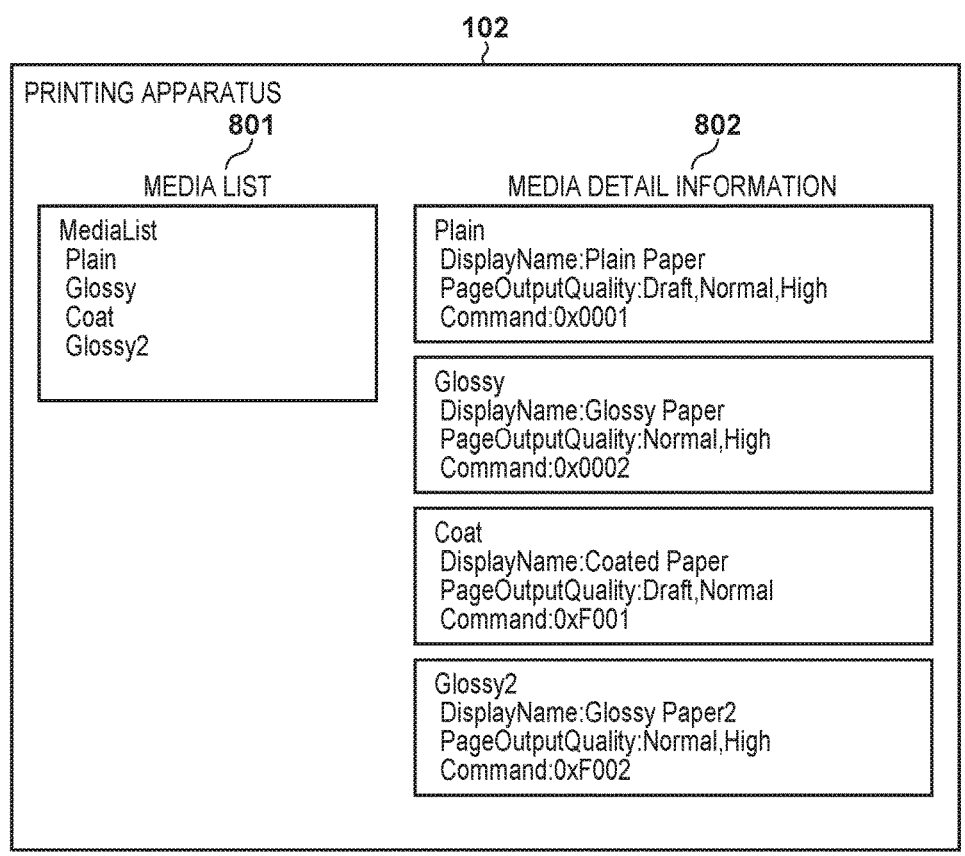
FIG. 9 is a view that illustrates a state in the printing apparatus after adding media.

FIG. 9 is a view that illustrates a state of the printing apparatus 102 after new media has been added to the media that can be used in the printing apparatus 102. Two items that were not present at the time of shipment of the printer, Coat and Glossy2, have been added to the media list 801. Furthermore, media detail information 802 for the two added types of media has been added.

The description of the processing of the printer driver 203 will now be returned to.

As illustrated in FIG. 9, in the printing apparatus 102, two types of media that were not present when the printer driver 203 was generated, Coat and Glossy2, have been added. In the present embodiment, processing for adding these types of media as setting values for types of sheets (PageMediaType) of the printer driver 203 is performed.

Figure 10:
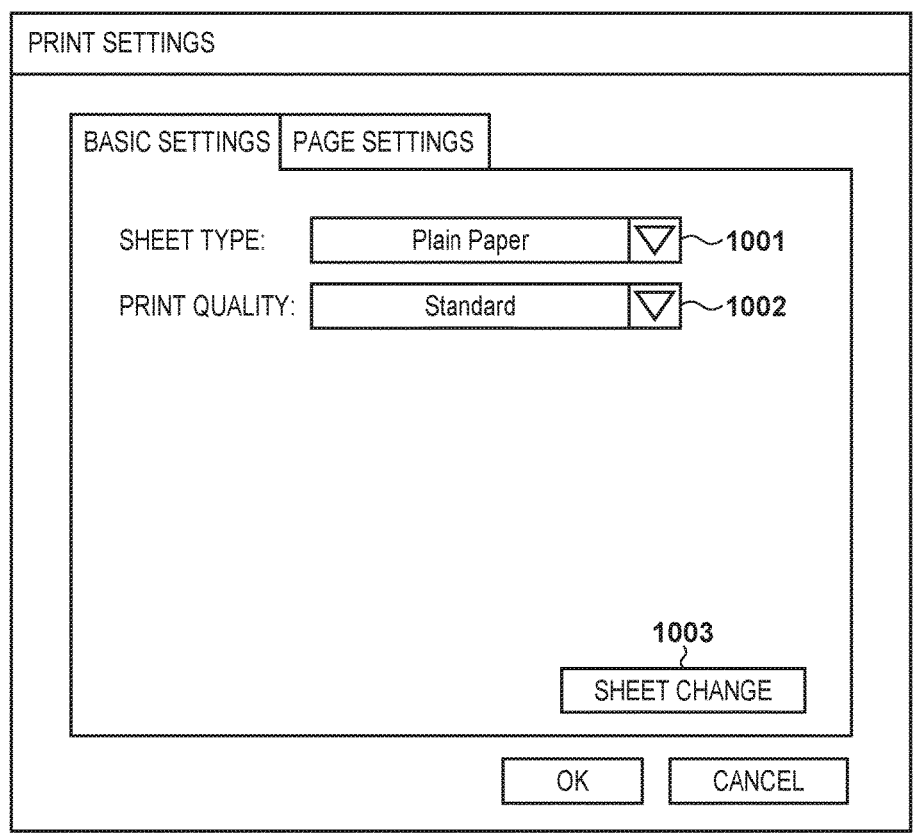
FIG. 10 is a view that illustrates a screen that is displayed by a printer extension.

FIG. 10 is a view illustrating an example of a screen displayed by the printer extension 215 in the present embodiment. The printer extension 215 displays a sheet type 1001 and a print quality 1002. Also, setting values that can be selected for each of these functions are displayed based on the description of the PrintCapabilities obtained from the configuration module 219. Furthermore, the printer extension 215 comprises a sheet update button 1003 as a function for feeding into the printer driver 203 information related to media to be added to the printing apparatus 102. In the case in which the sheet update button 1003 is pressed, the printer extension 215 obtains information by communicating with the printing apparatus 102, and updates the QPB with the obtained information.

Figure 11:
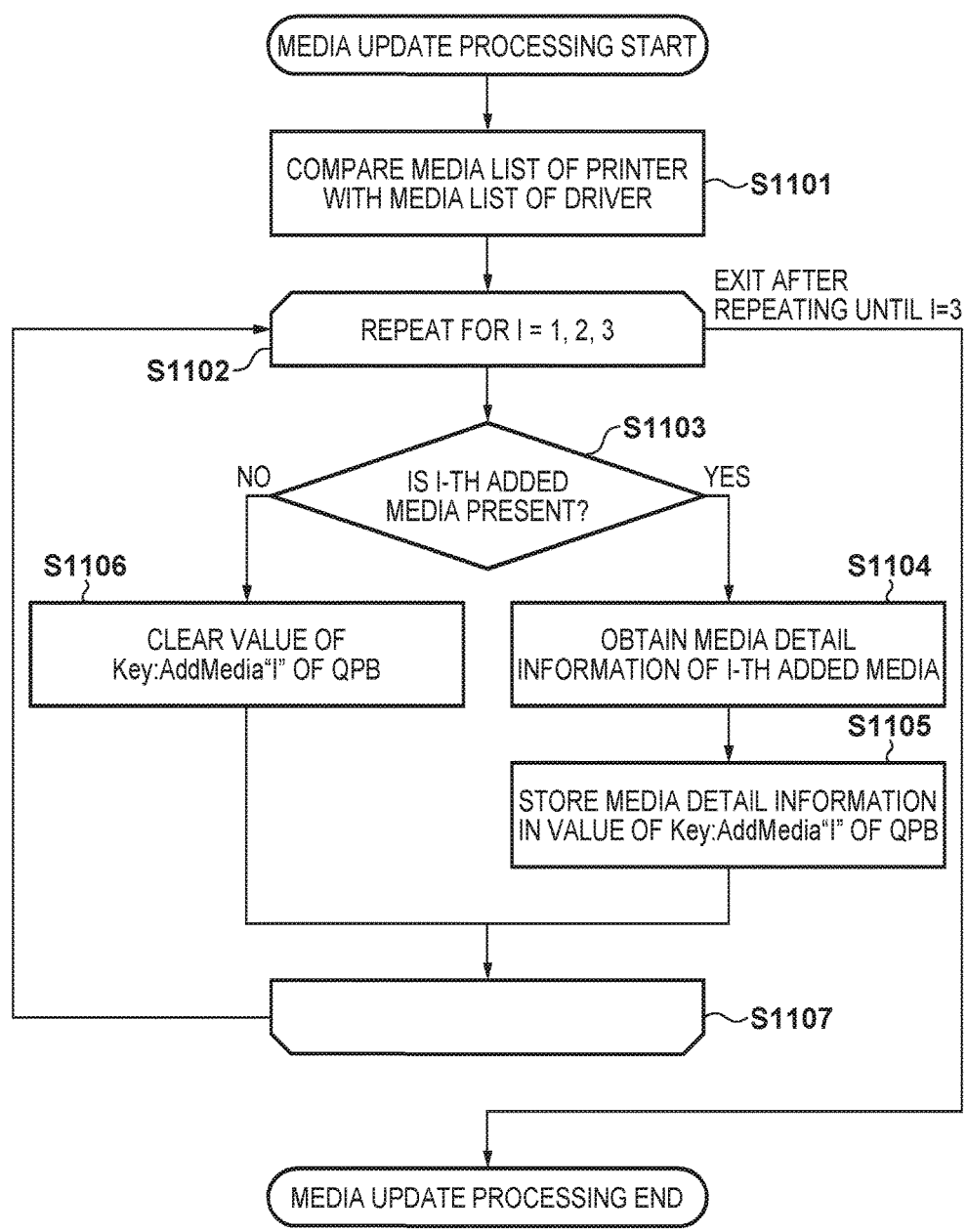
FIG. 11 is a flowchart that illustrates processing for when a sheet update is executed.

FIG. 11 is a flowchart illustrating processing that is executed by the printer driver 203 when the sheet update button 1003 is pressed from the printer extension 215. The processing of FIG. 11 is realized by the CPU 111 reading a program stored in the ROM 112 into the RAM 113 and executing the program, for example.

First, in step S1101, the media list 801 of the printing apparatus 102 is obtained, and the presence of media that was added to the printing apparatus 102 is confirmed by comparing the value of Value of Key:MediaList described in the QPB. In the present embodiment, in the case in which the media list 801 illustrated in FIG. 9 is obtained, it is determined that two types of media that were not present when the printer driver 203 was generated, Coat and Glossy2, are present.

Regarding step S1102 to step S1107, processing is performed repetitively based on the variable I for repetitive processing. The upper limit of the variable I is the same value as the upper limit on the number of types of media that can be added. In the present embodiment, because the upper limit on the number of types of media that can be added is three, the variable I is assigned 1, 2, and 3 in that order, and the repetitive processing is exited after repeating until I becomes 3.

In step S1103, it is determined whether or not there is an I-th additional media type. In the present embodiment, it is determined that there are two additional media types in step S1101. Accordingly, when I is 1 and when I is 2, the processing is advanced to step S1104, and, when I is 3, the processing is advanced to step S1106.

In step S1104, information of the I-th additional media type is obtained. Here the media detail information 802 for the added media is obtained from the printing apparatus 102. In the present embodiment, the media detail information 802 for Coat is obtained from the printing apparatus 102 in the processing when I is 1, and the media detail information 802 for Glossy2 is obtained from the printing apparatus 102 in the processing when I is 2.

In step S1105, the media detail information 802 obtained in step S1104 is stored in the Value region of Key:Addmedia"I," which is defined in the QPB. In the present embodiment, in the processing when I is 1, the media detail information 802 for Coat is stored in the Value region of Key:AddMedia1 of the QPB. Then, in the processing when I is 2, the media detail information 802 for Glossy2 is stored in the Value region of Key:AddMedia2 of the QPB.

Meanwhile, in step S1106, the value of Value for the Key:Addmedia"I" in the QPB is cleared. In the present embodiment, in the processing when I is 3, the value of Value for Key:Addmedia3 of the QPB is cleared.

FIG. 12 illustrates a state of the QPB after performing the processing of FIG. 11 by executing a sheet update 1003 from the printer extension 215. In the Value region of Key:AddMedia1, information corresponding to the media detail information 802 of Coat is stored, and in the Value region of Key:AddMedia2, information corresponding to the media detail information 802 of Glossy2 is stored. Also, the Value region of Key:AddMedia3 is empty.

Next, a description is given of processing for generating a PrintCapabilities necessary for including additional media information in the setting values of the sheet type 1001 of FIG. 10.

Figure 13:
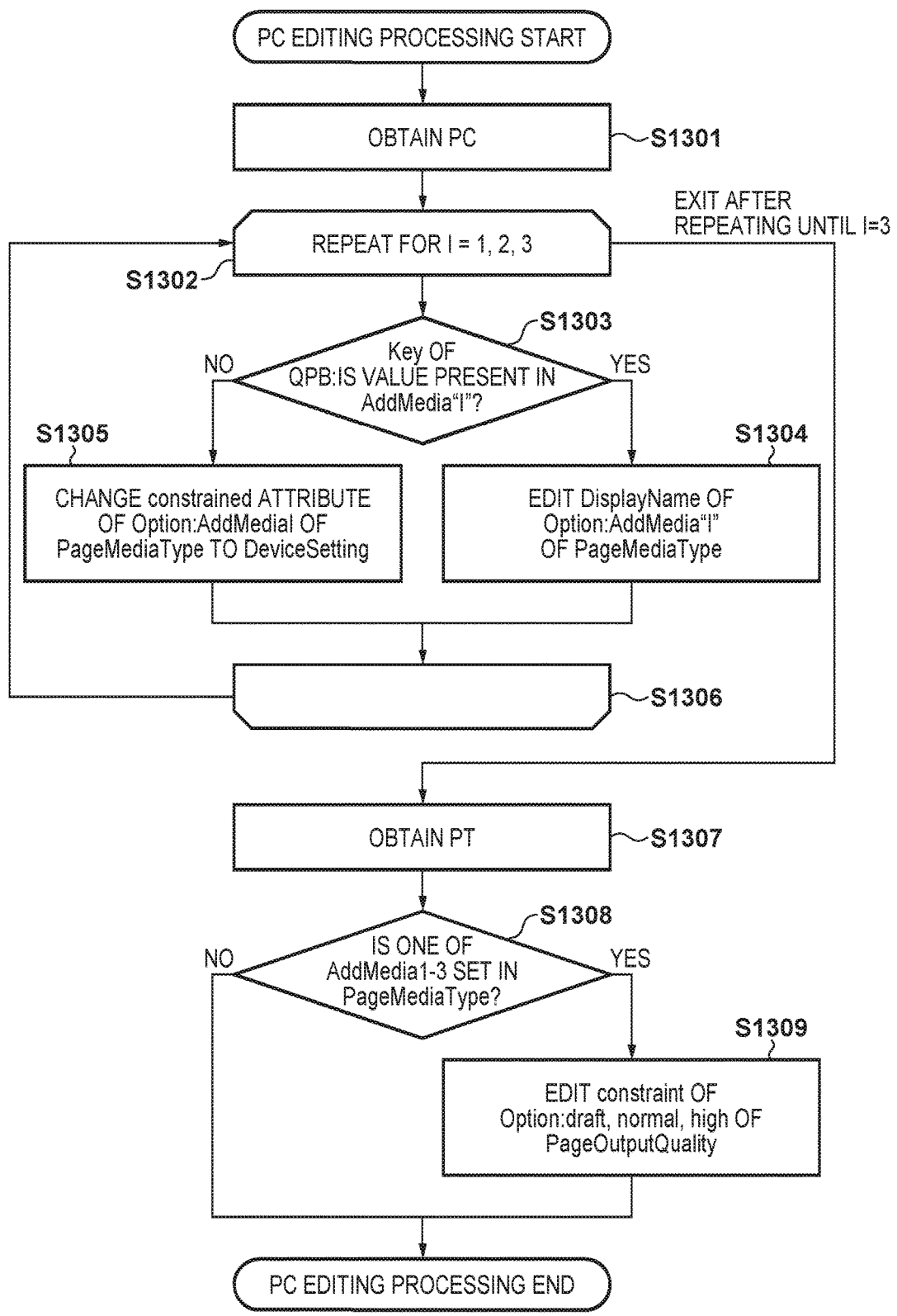
FIG. 13 is a flowchart that illustrates a PrintCapabilities generation process.

FIG. 13 is a flowchart that illustrates processing to generate a PrintCapabilities in the print setting editing module 211. In this process, the configuration module 219 performs vendor-specific processing in relation to the PrintCapabilities generated based on the print setting definition file 213. The processing of FIG. 13 is realized by the CPU 111 reading a program stored in the ROM 112 into the RAM 113 and executing the program, for example.

First, in step S1301, the print setting editing module 211 obtains the PrintCapabilities to be edited. The PrintCapabilities is something that the configuration module 219 generated based on the print setting definition file 213.

For step S1302 to step S1306, processing is performed repetitively based on the iteration variable I. The upper limit of the variable I is the same value as the upper limit on the number of types of media that can be added. In the present embodiment, because the upper limit on the number of types of media that can be added is three, the variable I is assigned 1, 2, and 3 in that order, and the repetitive processing is exited after repeating the processing until I becomes 3.

In step S1303, the print setting editing module 211 determines whether or not there is a value present in the Value region for Key:AddMedia"I" by referencing the QPB. In the case in which it is determined that a value is present, the processing is advanced to step S1304, and, in the case in which it is determined that there is no value present, the processing is advanced to step S1305. In the present embodiment, by referencing the QPB illustrated in FIG. 12, it is determined that a value is present in the Value region when I is 1 and when I is 2, and it is determined that there is no value present in the Value region when I is 3.

In step S1304, the print setting editing module 211 changes the DisplayName of the AddMedia"I" option of the PageMediaType in the PrintCapabilities to be edited to the DisplayName described in the QPB. In the present embodiment, in the case in which I is 1, the value of Value for Key:AddMedia1 is referenced in the QPB of FIG. 12, and the character string "DisplayName":"Coated Paper" is retrieved from the value of the Value region. This means that the title corresponding to AddMedia1 is Coated Paper. Accordingly, the DisplayName of the AddMedia1 option is changed from AddMedia1 to Coated Paper. Similarly, in the case where I is 2, the DisplayName of the AddMedia2 option is changed from AddMedia2 to Glossy Paper2. Note that, the results of these changes are illustrated in FIG. 15.

Meanwhile, in step S1305, the print setting editing module 211 changes the Constrained attribute of the AddMedia"I" option of PageMediaType to DeviceSettings. In the present embodiment, in the case in which I is 3, the Constrained attribute of AddMedia3 option is changed to DeviceSettings.

By performing the processing of step S1304 and step S1305, the setting value ends up being displayed with the correct title for the title of the media that was added in the sheet type 1001 in a screen (for example, FIG. 10) displayed by the printer extension 215. Also, it becomes possible for the printer extension 215 to determine, in accordance with the Constrained attribute, options that cannot be set, and to perform control so not to include them in the setting values. Accordingly, Addmedia3 is not displayed as a setting value that can be selected for the sheet type 1001 of FIG. 10, for example. Also, without limitation to the printer extension 215, a similar display becomes possible for an application that displays print settings by referencing the PrintCapabilities.

From step S1307 to step S1309 is processing for editing the PrintCapabilities in accordance with designated print settings (PrintTicket).

In step S1307, the print setting editing module 211 obtains the PrintTicket. In step S1308, the print setting editing module 211 confirms the setting value of the PageMediaType, and determines whether or not the setting value is one of AddMedia1, AddMedia2, and AddMedia3. In the case in which it is determined that the setting value is one of AddMedia1, AddMedia2, and AddMedia3, the processing is advanced to step S1309.

In step S1309, the print setting editing module 211 changes the Constrained attribute corresponding to the PageOutputQuality option (Draft, Normal, High). It does this by detecting the same Key as the setting value of the PageMediaType of the PrintTicket in the QPB, and making the change based on the description of the value of the Value region.

In the present embodiment, in the case in which Coated Paper is selected by using the printer extension 215, for example, AddMedia1 is set in the PrintTicket. In such a case, first, the value of the Value region for Key:AddMedia1 is referenced in the QPB of FIG. 12. Then, from in the value of the Value region, the character string "PageOutputQuality":"Draft, Normal" is retrieved. This denotes the print qualities that are supported for AddMedia1, and means that Draft and Normal, which are described, are supported, and High, which is not described, is not supported. Accordingly, for PageOutputQuality in the PrintCapabilities, the Constrained attribute for the Draft option and the Normal option is changed to None. Also, the Constrained attribute of the High option is changed to PrintTicketSettings.

By performing the processing of step S1309, in relation to the print quality 1002 of the printer extension 215, options that cannot be set are determined in accordance with the Constrained attribute. Then, it becomes possible for the printer extension 215 to perform control so not to include options that cannot be set as alternatives on the screen of FIG. 10. For example, in the case in which Coated Paper is selected in the screen of FIG. 10, High becomes non-displayed as a setting value in the print quality 1002.

FIG. 15 is a portion of the PrintCapabilities generated by the processing of the flowchart of FIG. 13. Therein, the underlined portions are portions at which a change was applied by the print setting editing module 211.

Next, PrintTicket validity verification processing will be described. In the present embodiment, independent changes are made in the print setting editing module 211 in relation to the PrintCapabilities as described above. Accordingly, in the present embodiment, for the print settings (PrintTicket) validity verification, independent validity verification processing is performed by the print setting editing module 211.

Figure 14:
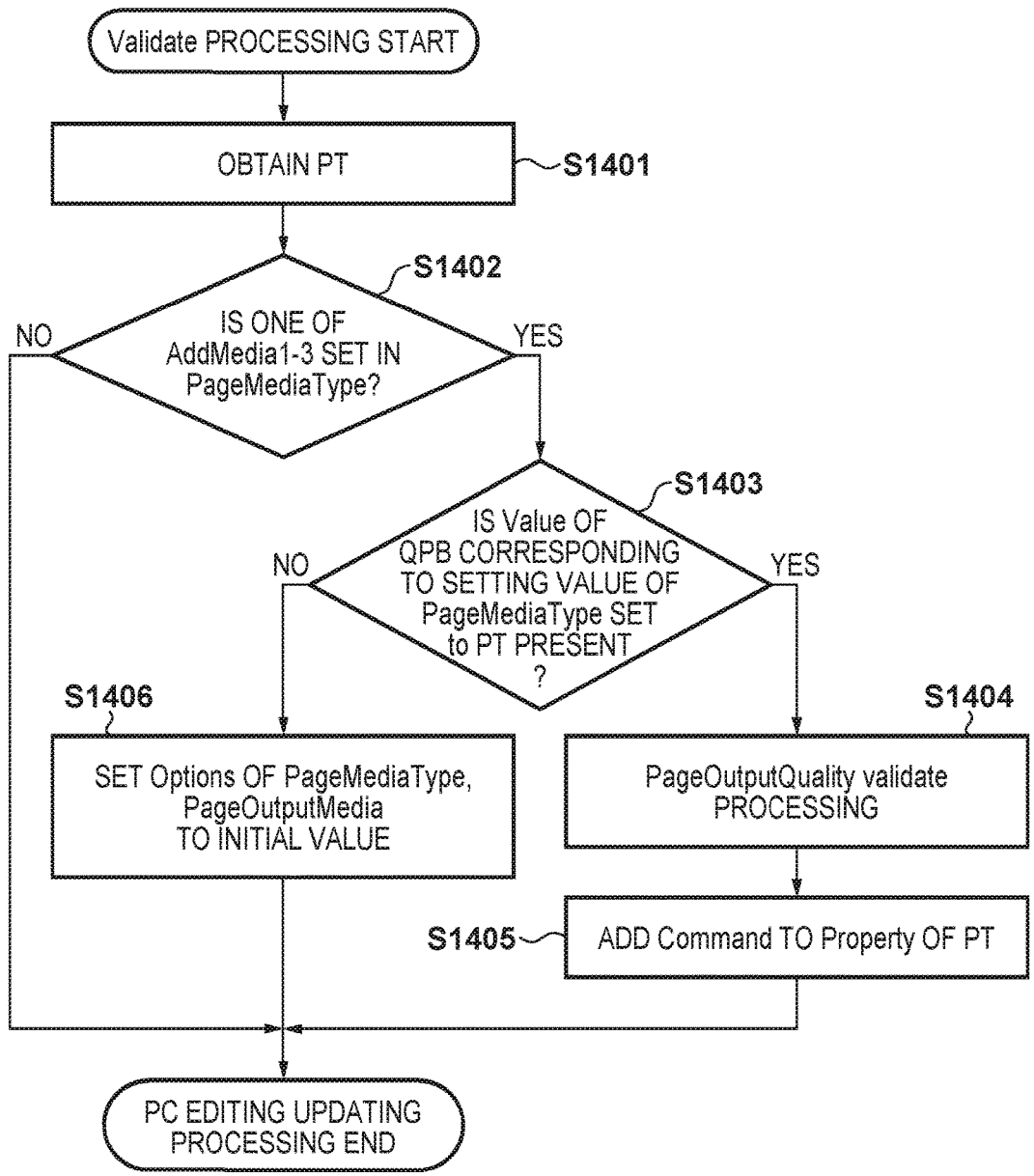
FIG. 14 is a flowchart that illustrates a PrintTicket validity verification process.

FIG. 14 is a flowchart that illustrates PrintTicket validity verification processing in the print setting editing module 211. The processing of FIG. 14 is realized by the CPU 111 reading a program stored in the ROM 112 into the RAM 113 and executing the program, for example.

In step S1401, the print setting editing module 211 obtains the PrintTicket (or PT) to be verified. Note that the PrintTicket to be verified may be generated by the application, or it may be generated by using the screen of the printer extension of FIG. 10. For example, in the case in which Coated Paper is selected by using the printer extension, AddMedia1 is set in the PrintTicket. Meanwhile, in the case in which GlossyPaper2 is selected by using the printer extension, AddMedia2 is set in the PrintTicket. Note that the obtained PrintTicket is something for which a verification based on the print setting definition file 213 is performed in the configuration module 219. Accordingly, the processing in FIG. 14 is vendor-specific processing by which the print setting editing module 211 performs addition in relation to the processing results of the configuration module 219.

In step S1402, the print setting editing module 211 obtains the setting value of PageMediaType from the obtained PrintTicket, and branches the processing depending on the setting value. In a case in which the setting value is one of AddMedia1, AddMedia2, and AddMedia3, the processing is advanced to step S1403. Otherwise, the processing of FIG. 14 is ended.

In step S1403, the print setting editing module 211 branches the processing depending on whether or not the value of the Value region in the QPB corresponding to the setting value of the PageMediaType set in the PT is present. For example, in the case in which AddMedia1 is set in the PT, when comparing against the QPB of FIG. 12 in the present embodiment, the value of the Value region for Key: AddMedia1 is present, and, therefore, the processing is advanced to step S1404 when Yes is determined in step S1403. Meanwhile, in the case in which AddMedia3 is set in the PT, the value of the Value region for Key:AddMedia3 is not present in the QPB of FIG. 12, No is determined in step S1403, and the processing is advanced to step S1406. Note that, in the case of setting by using the screen of the printer extension of FIG. 10, AddMedia3 is not displayed and, therefore, there is no case in which AddMedia3 is set in the PT. As described above, in a case in which the PrintTicket is generated by the application, the user can freely generate a PrintTicket. There are cases in which AddMedia3 is set in the PT in the case of generating the PrintTicket by using an application.

Next, in step S1404, the print setting editing module 211 performs validity verification processing for the PageOutputQuality set in the PT. Here, in a case in which added media is set in the PT, it means that processing for verifying whether print quality (PageOutputQuality), which cannot be set for that media, has not been set. For example, in the case in which AddMedia2 has been set in the PT, comparing against the QPB of FIG. 12, the character string "PageOutputQuality":"Normal, High" is retrieved from the value of Value of Key:AddMedia2. This denotes the print qualities that are supported for AddMedia2, and means that Normal and High, which are described, are supported, and Draft, which is not described, is not supported. In accordance with, in the case in which the Normal option or the High option is set in the PageOutputQuality of the PT, the PT is determined to be valid. On the other hand, in the case in which the Draft option has been set in the PageOutputQuality of the PT, it is determined that an improper combination is described in the PT. Then, the PageOutputQuality option is changed to a print quality that is supported in AddMedia2 (for example, Normal).

In step S1405, the print setting editing module 211 adds the Property value to the PT. The Property value to be added is the print command value to be used in the case of performing a print instruction with the added media with respect to the printing apparatus 102. For example, in the case in which AddMedia2 has been set in the PT, comparing against the QPB of FIG. 12, the character string "Command":"0xF002" is retrieved from the value of the Value region of Key:AddMedia2. This means that the print command for performing printing with respect to the printing apparatus 102 with AddMedia2 is 0xF002. Accordingly, 0xF002 is added as the Property value of the PT. By this process, the print command filter 225, after receiving the PT, can identify the added media by referencing the Property value in which the print command is described. Also, here, a configuration included in the PT is described as a configuration by which the print command filter 225 knows the print command. The added media may, however, be identified by another method. Specifically, a configuration may be taken such that the print command filter 225 obtains the value of the print command of the added media by directly referencing the QPB. For example, in a case in which AddMedia2 is set in the PT, the print command filter 225 can identify that it is 0xF002 by referencing the QPB directly.

Meanwhile, in the case in which No is determined in step S1403, the print setting editing module 211 changes the setting values the PageMediaType and the PageOutputQuality in the PT to the default settings in step S1406. A configuration may be such that the default settings are stored in advance in the DPB.

Figures 16, 17:
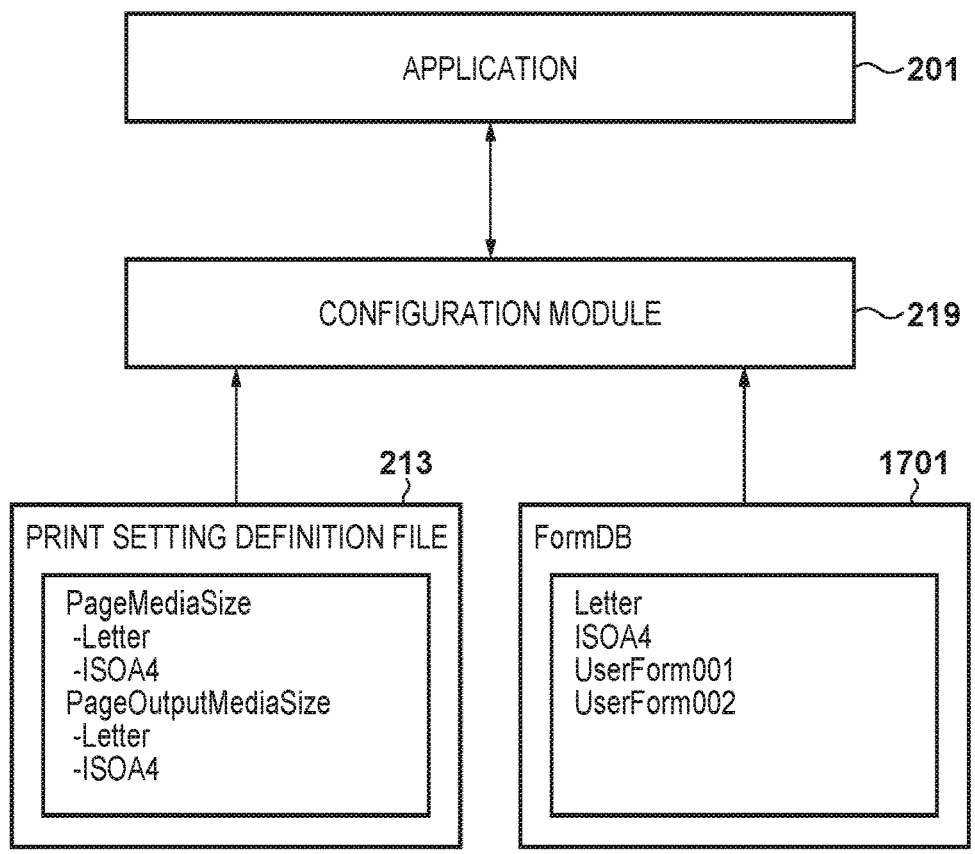
FIG. 16 is a view that illustrates PrintTicket after the processing of FIG. 14.
FIG. 17 is a view that illustrates a configuration for deciding a setting that is related to a sheet size.

FIG. 16 is a portion of the PrintTicket generated by the processing of the flowchart of FIG. 14. Here, it is assumed that AddMedia2 has been set in the PT, and the underlined portions are portions at which a change was applied by the print setting editing module 211.

As described above, in the present embodiment, options that can be added to the print setting definition file 213 are defined in advance for each of the setting values that can be added. Then, the print setting editing module 211 edits the content of the options to a form that corresponds to the content of the added setting values. By the present embodiment, it becomes possible for the printer extension 215 and the application to display the setting values of the print settings from the PrintCapabilities, and to perform print settings based on a standard procedure for saving print settings in a PrintTicket. Also, the printer extension 215 and the application need not perform control by distinguishing options from when the printer driver was generated and added options.

Second Embodiment

In the first embodiment, by defining, in advance, in the print setting definition file, options in accordance with added items of a number to be added, addition of selectable items is realized. In the system of the first embodiment, it is necessary to know in advance the upper limit on the number of options that will be added. In the present embodiment, a description is given of points that differ from the first embodiment for a system that enables the addition of any number of options.

In the present embodiment, a description is given using the example of adding a sheet size. For example, there are cases in which an input sheet size (PageMediaSize) and an output sheet size (PageOutputMediaSize) are set for sheet size in a PrintTicket. The PageMediaSize is a setting that is defined in a standard print schema, and the PageOutputMediaSize is a setting that is defined independently by a vendor. For example, in the case of a fit-to-page print in which input data is fit to accord to an output sheet, the size of the data that the application is to generate is set in the input sheet size, and the sheet size to be actually printed is set in the output sheet size. Also, in a V3 printer driver, it is possible to use both an input sheet size and an output sheet size by registering sheet sizes that a user defined themself in a FormDB 1701 provided by the OS.

Since the configuration module 219, which is provided by the OS, is responsible for print setting processing in a V4 printer driver, however, it basically is not possible to freely handle setting items that have not been defined in the print setting definition file. The configuration module 219 makes it possible to use a size registered in the FormDB 1701 with PageMediaSize, which is a standard setting. Meanwhile, with PageOutputMediaSize, which is defined independently, it is only possible to use items described in the print setting definition file. Since it is desirable to provide the same selection items in the input sheet size and the output sheet size, however, there is a demand to be able to apply a sheet size that a user added to the FormDB 1701 to the output sheet size.

FIG. 17 is a view that illustrates a configuration for deciding a setting that is related to a sheet size. When the application 201 makes a request for a PrintCapabilities to the printer driver 203, the configuration module 219 generates the PrintCapabilities based on the print setting definition file 213. Regarding PageMediaSize, however, since the sheet sizes registered in the FormDB 1701 are also included in the options, the configuration module 219 references the FormDB 1701 in addition to the print setting definition file 213. Here, the FormDB 1701 is a database comprised in the OS in which the user can register sizes as appropriate. Note that the sheet sizes described in the print setting definition file 213 are registered in the FormDB 1701 when the printer driver 203 is installed. In the example of FIG. 17, in the FormDB 1701, in addition to Letter and A4 size, which are described in the print setting definition file 213, the two sizes of UserForm0001 and UserForm0002, which the user registered, have been additionally registered.

FIGS. 18A and 18B are views illustrating an example of PrintCapabilities generated by the configuration of FIG. 17. In the print setting definition file 213, Letter size and A4 size are described in both the PageMediaSize and the PageOutputMediaSize. Accordingly, in the PrintCapabilities, Options for A4 size and Letter size are present. In addition, in the PageMediaSize, the sizes registered by the user (UserForm0001 and UserForm0002) are present as Options in the FormDB 1701.

Accordingly, the user can set the sizes that they themself registered in the FormDB 1701 in the PageMediaSize, but cannot set them in the PageOutputMediaSize. Even if the user were to set, to the PageOutputMediaSize, the user-registered sizes present in the PageMediaSize, the configuration module 219 would determine them to be options that are not present in the print setting definition file 213. Consequently, they would be treated as improper values. Settings that are treated as improper values will not be reflected in printing because they end up being changed to the default settings in the validity verification processing of the configuration module 219. Accordingly, in functions other than PageMediaSize, it is necessary to describe options to be set in the print setting definition file 213.

Figure 19:
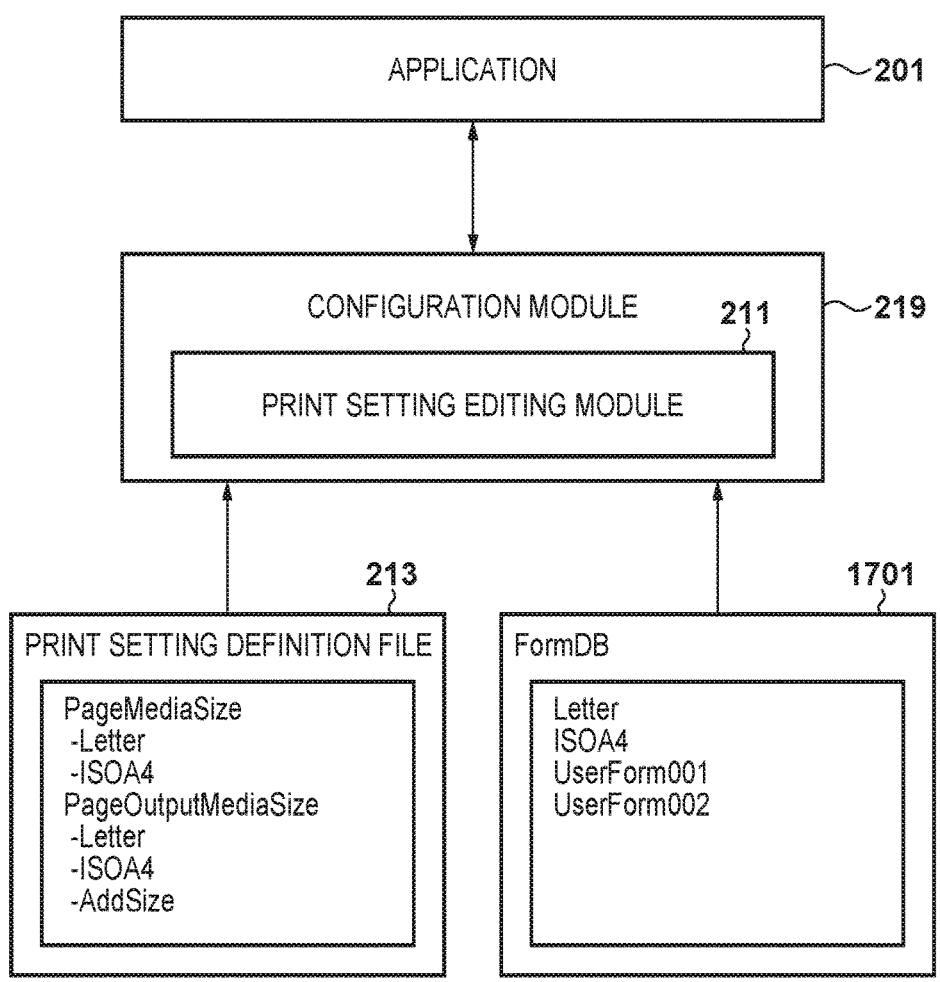
FIG. 19 is a view that illustrates a configuration for deciding a setting that is related to a sheet size.

FIG. 19 is a view that illustrates a configuration for deciding a setting that is related to a sheet size in the present embodiment. In the print setting definition file 213, an Option (AddSize) for setting an additional size that is desired to be used as an Option of the PageOutputMediaSize is defined. Also, in the present embodiment, the print setting editing module 211 for making extension settings in relation to the PrintCapabilities that the configuration module 219 generated is provided. The print setting editing module 211 can perform vendor-specific editing in relation to PrintCapabilities and PrintTicket for each process. Here, each process means PrintCapabilities generation, Devmode structure and PrintTicket conversion, and validity verification processes.

FIG. 20 is a flowchart that illustrates processing to generate a PrintCapabilities in the print setting editing module 211. In this process, the configuration module 219 performs vendor-specific processing in relation to the PrintCapabilities generated based on the print setting definition file 213. The processing of FIG. 20 is realized by the CPU 111 reading a program stored in the ROM 112 into the RAM 113 and executing the program, for example. Note that FIG. 20 is started when, for example, the application 201 makes a request to the configuration module 219 to obtain a PrintCapabilities.

First, in step S2001, the print setting editing module 211 obtains the PrintCapabilities to be edited. The obtained PrintCapabilities is something that the configuration module 219 generated based on the print setting definition file 213 and the FormDB 1701.

In step S2002, the print setting editing module 211 confirms the difference between items that can be set between the PageMediaSize and the PageOutputMediaSize. When described using the example of FIG. 19, the content of the FormDB 1701 is reflected in the PageMediaSize of the print setting definition file 213. In other words, UserForm0001 and UserForm0002 are added to PageMediaSize in the print setting definition file 213, but not added to PageOutputMediaSize. In other words, UserForm0001 and UserForm0002 are confirmed as the difference. Note that AddSize is not the target of the confirmation of the difference because it is a special item. In step S2003, the print setting editing module 211 determines whether or not sizes registered by the user are present based on confirmation performed in step S2002. The print setting editing module 211 determines that a size registered by the user is present if there is an item that is present only in the PageMediaSize in the print setting definition file 213, for example. In the case in which it is determined that there is no size registered by a user, the processing advances to step S2004, and, in the case in which it is determined that there is a size registered by a user, the processing advances to step S2005. In other words, in the example of FIG. 19, since PageMediaSize comprises UserForm0001 and UserForm0002 which PageOutputMediaSize does not contain, Yes is determined in step S2003. Note that the determination of step S2002 may be performed by a comparison between items of a particular function (for example, PageMediaSize) in the print setting definition file 213 and items of the particular function (for example, PageMediaSize) in the PrintCapabilities.

In step S2004, the print setting editing module 211 changes the "constrained" attribute of the AddSize option of PageOutputMediaSize to DeviceSettings. Thereby, the application, after referencing PrintCapabilities, can determine AddSize to be an option that cannot be set. Accordingly, the application, after referencing PrintCapabilities, for example, makes AddSize non-displayed as a setting value for the output sheet size. Alternatively, AddSize is grayed out.

Meanwhile, in step S2005, the print setting editing module 211 adds PageAddMediaSize, which is a setting for storing the actual form of an added size as a ParameterDef in the PrintCapabilities. Note that an example of the result after addition is illustrated in FIGS. 21A and 21B. Note that in the ParameterDef, a rule as to the kind of form in which target setting items can be set is described. Settings defined in the ParameterDef in the PrintCapabilities are set in accordance with a rule defined in the ParameterDef as a Parameterinit in the PrintTicket.

From step S2006 to step S2009 is processing for editing the PrintCapabilities in accordance with designated print setting information (PrintTicket). Note that the PrintTicket is obtained from the request source that requested issuance of the PrintCapabilities related to the start request in the processing of FIG. 20. In the PageMediaSize of PrintCapabilities, ScoredPropertys, which represent external forms of sheet sizes, are added. This addition is executed by the configuration module as processing related to step S2001. Accordingly, it can be considered that for the PageOutputMediaSize, similar information is added so as to know what kind of size for each item. In this case, for AddSize, which is an item corresponding to added sizes, since an assigned sheet size changes depending on the PageAddMediaSize, which is a parameter that represents an actual form, it is necessary that editing be performed in accordance with the content of the PrintTicket.

In step S2006, the print setting editing module 211 obtains the PrintTicket. In step S2007, the print setting editing module 211 confirms the setting value of PageAddMediaSize in the obtained PrintTicket. Also, the print setting editing module 211 determines whether or not an item corresponding to a setting value is present in the items that can be set in the PageMediaSize of the PrintCapabilities. In the case in which it is determined that no supported item is present, the processing advances to step S2008. In the case in which a supported item is determined to be present, the processing advances to step S2009.

In step S2008, the print setting editing module 211 sets the width and height of the size, which is the default setting value of the PageOutputMediaSize, as the ScoredProperty of the AddSize option. Here, these are set as MediaSizeWidth/MediaSizeHeight. Meanwhile, in step S2009, the print setting editing module 211 sets, as the ScoredPropertys of the AddSize option, the width and height of the size corresponding to the value set in PageAddMediaSize. Here, the processing of step S2006 to step S2009 is described using FIG. 19. For example, "UserForm0001" is described as the AddMediaSize of the PrintTicket obtained in step S2006. In such a case, the print setting editing module 211 confirms whether or not UserForm0001 is present in the PageMediaSize of the PrintCapabilities in step S2007. For example, UserForm0001 is included as PageMediaSize in the PrintCapabilities of FIGS. 18A and 18B. Accordingly, the print setting editing module 211 determines Yes in step S2007, and describes the width "200000" and the height "250000" based on FIGS. 18A and 18B in step S2009. By the foregoing processing, the width and the height in AddSize of PageOutputMediaSize are described as in FIGS. 21A and 21B. Note that description will be given of a case in which a setting value (for example, UserForm0003) that is not included in PrintCapabilities as the AddMediaSize of the PrintTicket obtained in step S2006 is described. The print setting editing module 211 determines No in step S2007, and describes the default value in AddSize of the PageOutputMediaSize.

By the processing of FIG. 20, in the case in which an added size is present, an option corresponding to the added size can be selected, and also PrintCapabilities, in which it is represented that it is possible to set a parameter indicating an actual form of an added size, is generated. Note that setting in a Parameterinit the actual form of the added size is envisioned in the present embodiment. A definition as ScoredPropertys attached to AddSize, or a definition as Propertys of another item are, however, also possible, and limitation is not made to this embodiment.

FIGS. 21A and 21B are views illustrating an example of the PrintCapabilities generated by the processing of FIG. 20. Note that FIGS. 21A and 21B are PrintCapabilities generated in a case in which UserForm0001 is described in the PrintTicket obtained in step S2006. Here, only the PageOutputMediaSize and the newly added items for which the change was performed are described. As illustrated in FIG. 19, AddSize is added as an Option of the PageOutputMediaSize in the print setting definition file 213. Accordingly, AddSize is added as an Option of the PageOutputMediaSize in PrintCapabilities as well. In addition, PageAddMediaSize, which is a parameter for indicating the information of the size to be actually used when designating AddSize is added as ParameterDef.

By the PrintCapabilities of FIGS. 21A and 21B, it is possible to designate an item indicating an added size (AddSize) and information (PageAddMediaSize) of the size that will actually be used in order to use an added size in the output sheet size in the print settings. Also, by defining an item indicating an added size in the print setting definition file 213, it becomes possible to maintain a value in the verification of the validity of the PrintTicket.

Figure 22:
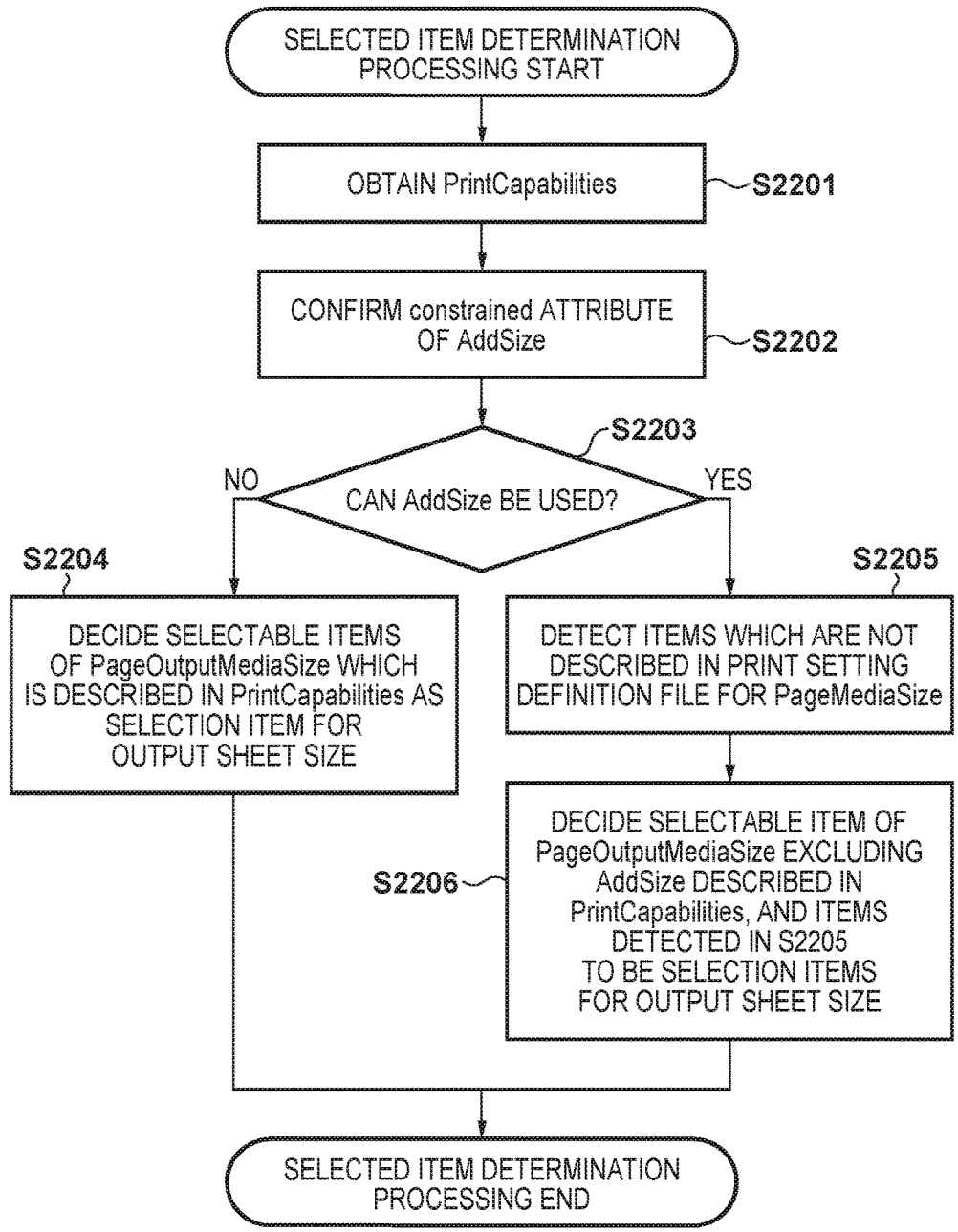
FIG. 22 is a flowchart that illustrates processing for determining a selectable item of an output sheet size.

FIG. 22 is a flowchart illustrating processing for determining items that can be selected for the output sheet size in the printer extension 215. The processing of FIG. 22 is realized by the CPU 111 reading a program stored in the ROM 112 into the RAM 113 and executing the program, for example. In the present embodiment, only one selection item corresponding to a plurality of added items is provided for a target function. Accordingly, when selectable items are displayed in accordance with a PrintCapabilities, the added item cannot be included in the selection items. Accordingly, it is necessary to confirm whether an added item is present, and to decide the selection items in conjunction with other information in the case in which one is present.

First, in step S2201, the printer extension 215 obtains the PrintCapabilities generated by the processing of FIG. 20. Next, in step S2202, the printer extension 215 obtains the Constrained attribute of AddSize which is present in PageOutputMediaSize.

In step S2203, the printer extension 215 determines whether or not AddSize can be used from the attribute value obtained in step S2202, and, in the case in which it is determined that it cannot be used, the processing advances to step S2204, and, in the case in which it is determined that it can be used, the processing advances to step S2205. For example, if "None" is set in the Constrained attribute of AddSize, it is determined to be usable, and if an added size is not present, and "DeviceSettings" is set by processing of step S2004 of FIG. 20, it is determined to be impossible to use. Note that since None is set in the Constrained attribute of AddSize in the PrintCapabilities (FIGS. 21A and 21B) generated by the processing of FIG. 20, Yes is determined in step S2203.

Step S2204 is processing for a case in which it is determined that no added size is present. In the case in which it is determined that no added size is present, only items described in the print setting definition file 213 can be used, and so the printer extension 215 decides selection items based on the PrintCapabilities. Note that because AddSize is made to be impossible to use by the Constrained attribute, it is not added to the selection items.

From step S2205 to step S2206 is processing for a case in which it is determined that an added size is present. In step S2205, the printer extension 215 detects an item that has not been described in the print setting definition file 213 from the selectable items of the PageMediaSize of the PrintCapabilities. Specific description will be given using FIGS. 18A and 18B and FIG. 19. The printer extension 215 references the PageMediaSize in the PrintCapabilities of FIGS. 18A and 18B. Consequently, "(NorthAmerican) Letter", "ISOA4", "UserForm0001", and "UserForm0002" are detected as items. Meanwhile, "Letter" and "ISOA4" are described as PageMediaSize in the print setting definition file 213 of FIG. 19. Specifically, in step S2205, "UserForm0001" and "UserForm0002" are detected.

In step S2206, the printer extension 215 decides the selectable items of the PageOutputMediaSize described in the PrintCapabilities and the selectable items of the output sheet size in addition to the items detected in step S2205. Then, the print setting screen is provided to the user based on the decided selectable items. For example, the printer extension 215 provides a combo box for allowing selection of the output sheet size and provides the aforementioned decided selectable items as alternatives in the combo box. In the case in which FIG. 22 is executed by using FIGS. 18A and 18B, FIG. 19, and FIGS. 21A and 21B, Letter, A4, UserForm0001, and UserForm0002 are displayed in the alternatives for output sheet size in the print setting screen.

At that time, because, among the selectable items of the PageOutputMediaSize described in the PrintCapabilities, AddSize, which indicates additional size, is not an item that has meaning on its own, it is excluded from the selectable items.

By the processing of FIG. 22, the printer extension 215 can provide a user interface that enables a user to execute print settings including an added item. In the case in which the user selects an added item in the provided setting control, the printer extension 215 sets AddSize to the PageOutputMediaSize in the PrintTicket. Note that, in a case in which an added item is selected, the printer extension 215 decides that AddSize be set to the PageOutputMediaSize of the PrintTicket in advance. In the present embodiment, in the cases in which UserForm0001 or UserForm0002 are selected, AddSize is set to the PageOutputMediaSize. The reason why the printer extension 215 sets AddSize to the PrintTicket in a case in which an added item is selected is to prevent a setting value that the user set by PrintTicket Validate processing being changed to another value. The actual form of the added size is then set to PageAddMediaSize. Regarding the actual form of the added size, it can be considered that the title of an Option present in the PageMediaSize is described as is, for example. In such a case, when set based on the PrintCapabilities of FIGS. 21A and 21B, UserForm0001 or UserForm0002 end up being set in PageAddMediaSize. The printer driver 203 decides that AddSize has been set in the PageOutputMediaSize, and decides which added size to use from the setting values of PageAddMediaSize.

Figure 23:
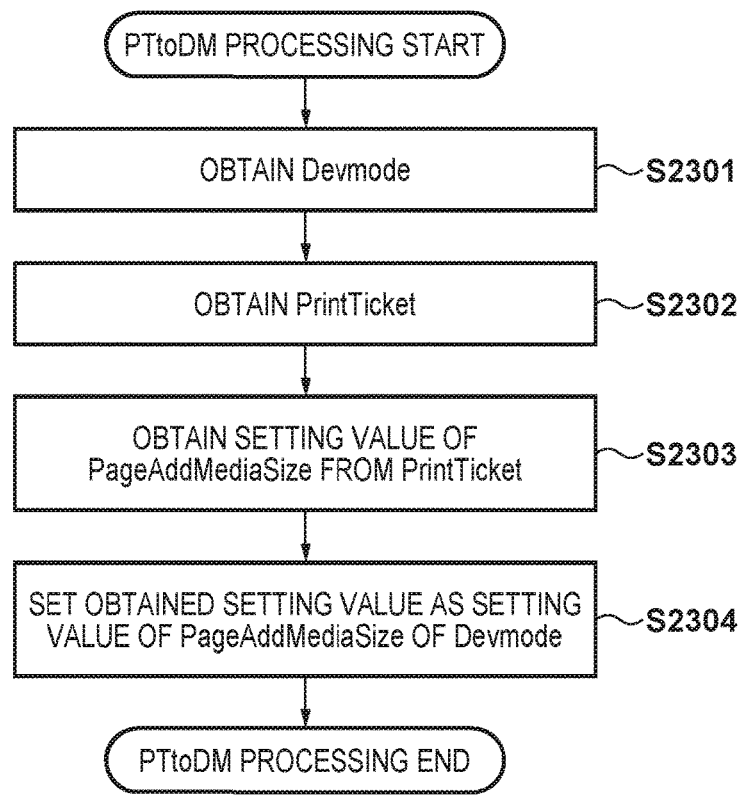
FIG. 23 is a flowchart that illustrates a process for conversion into Devmode.

FIG. 23 is a flowchart that illustrates processing to convert from a PrintTicket into a Devmode in the print setting editing module 211. The processing of FIG. 23 is realized by the CPU 111 reading a program stored in the ROM 112 into the RAM 113 and executing the program, for example. Two forms in which to store print settings exist: a Devmode and a PrintTicket. The configuration module 219 performs both-way conversion between Devmode and PrintTicket. The configuration module 219, however, performs conversion processing based on the print setting definition file 213. Accordingly, in order to maintain setting values of settings that are not defined in the print setting definition file 213, such as parameters, it is necessary to perform processing in the print setting editing module 211.

First, in step S2301, the print setting editing module 211 obtains the Devmode to be edited. Next, in step S2302, the print setting editing module 211 obtains a PrintTicket for setting values to be stored in the Devmode.

From step S2303 to step S2304 is processing for storing Parameterinit setting values in the Devmode. In step S2303, the print setting editing module 211 obtains a setting value of PageAddMediaSize from the PrintTicket. In step S2304, the print setting editing module 211 stores the setting value obtained in step S2303 in a corresponding setting of the Devmode.

To enable the value to be set in the Devmode, it is necessary to define an item to be used and a size in a DevmodePropertyBag (not shown). By this processing, it becomes possible to maintain a setting value in a parameter added independently in a V4 printer driver. Note that, in the present embodiment, sheet size is described as the target, but similar processing must be performed for a Parameterinit that was added independently.

Figure 24:
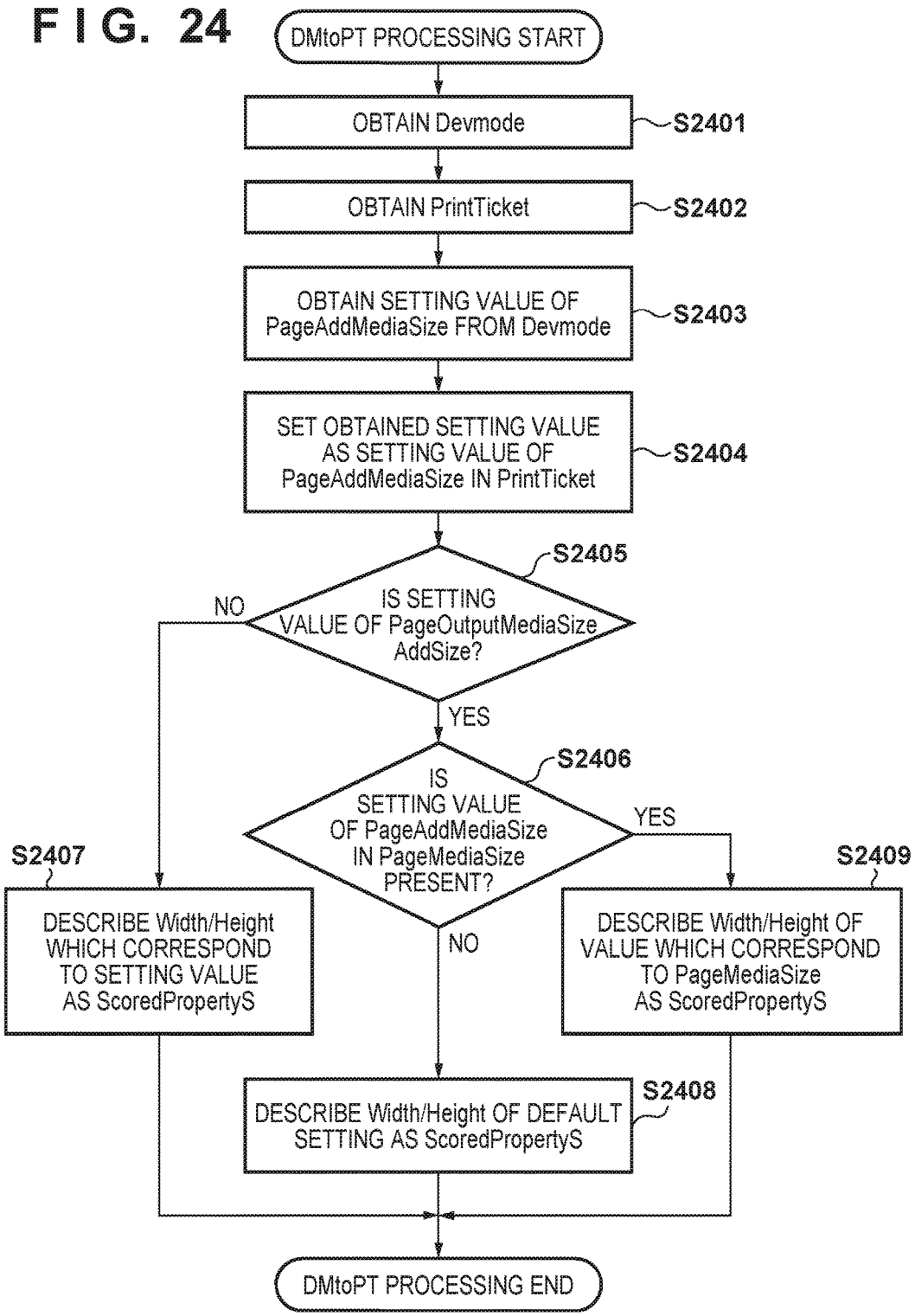
FIG. 24 is a flowchart that illustrates a process for conversion into PrintTicket.

FIG. 24 is a flowchart that illustrates processing to convert from a Devmode into a PrintTicket in the print setting editing module 211. The processing of FIG. 24 is realized by the CPU 111 reading a program stored in the ROM 112 into the RAM 113 and executing the program, for example. This processing is necessary for providing a setting that is added independently such as Parameterinit in the PrintTicket. Also, it is processing that is performed when the application 201 obtains the PrintTicket, and vendor-specific processing related to the PrintTicket is performed here.

First, in step S2401, the print setting editing module 211 obtains a Devmode that is the target when obtaining the setting values set in a Parameterinit, or the like, which is provided in the PrintTicket. In step S2402, the print setting editing module 211 obtains the PrintTicket to be edited.

In step S2403, the print setting editing module 211 obtains a setting value of PageAddMediaSize, which is provided in order to store information of an added sheet size, from the obtained Devmode. In step S2404, the print setting editing module 211 adds PageAddMediaSize as Parameterinit to the PrintTicket, and sets the value obtained in step S2403 as a setting value of PageAddMediaSize.

From step S2405 to step S2409 is processing for adding information of a width and a height of a sheet size as ScoredPropertys of the PageOutputMediaSize. First, in step S2405, the print setting editing module 211 determines whether or not a setting value of the PageOutputMediaSize in the PrintTicket is AddSize, which represents additional sheet size. In the case in which it is determined that AddSize has been set, the process advances to step S2406, and, in the case in which it is determined that AddSize has not been set, the process advances to step S2407.

In step S2406, the print setting editing module 211 determines whether or not a setting corresponding to a setting value of PageAddMediaSize is present in PageMediaSize. In the case in which none is determined to be present, the process advances to step S2408, and, in the case in which one is determined to be present, the process advances to step S2409. Note that the processing of step S2406 to step S2409 is the same as the processing of step S2007 to step S2009.

Since setting other than for an added size has been performed, the print setting editing module 211, in step S2407, adds the width and the height corresponding to the setting value as ScoredPropertys. In step S2408, since an added size that is not present has been designated, the print setting editing module 211 adds Width and Height of the default setting of PageOutputMediaSize as ScoredPropertys. In step S2409, since an added size has been set, the print setting editing module 211 obtains the height and the width from ScoredPropertys of a corresponding setting value of PageMediaSize in the setting value, and adds them as ScoredPropertys.

Figure 25:
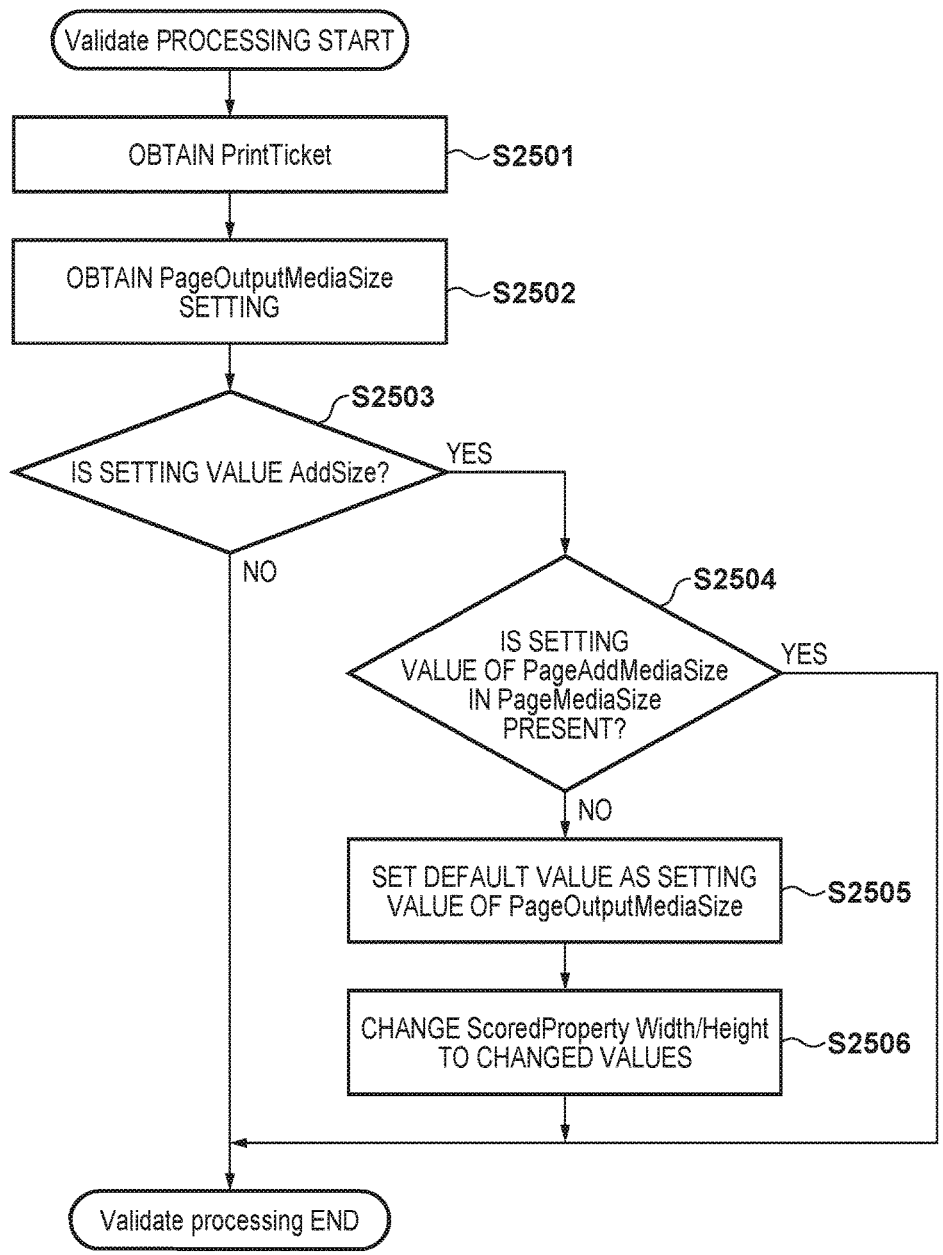
FIG. 25 is a flowchart that illustrates a PrintTicket validity verification process.

The application 201 and the printer driver 203, upon deciding the print setting, through processing, such as PTMergeAndValidate, perform PrintTicket validity verification. FIG. 25 is a flowchart that illustrates PrintTicket validity verification processing in the print setting editing module 211. The processing of FIG. 25 is realized by the CPU 111 reading a program stored in the ROM 112 into the RAM 113 and executing the program, for example.

First, in step S2501, the print setting editing module 211 obtains the PrintTicket to be verified. Note that the obtained PrintTicket is something for which a verification based on the print setting definition file 213 is performed in the configuration module 219. Accordingly, the processing in FIG. 25 is vendor-specific processing by which the print setting editing module 211 performs addition in relation to the processing results of the configuration module 219.

In step S2502, the print setting editing module 211 obtains a setting value of PageOutputMediaSize from the obtained PrintTicket. In step S2503, it is determined whether or not the setting value obtained in step S2502 is AddSize, which indicates an added size. In a case in which it is determined that the setting value of the PageOutputMediaSize is AddSize, the process advances to step S2504. In a case in which it is determined that the setting value of PageOutputMediaSize is not AddSize, the processing of FIG. 25 is ended because it is not necessary to perform additional editing.

In step S2504, the print setting editing module 211 confirms the setting value of PageAddMediaSize, which indicates an actual form of an added size, and determines whether or not it is present in a selectable item of PageMediaSize. In a case in which it is determined that the setting value of PageAddMediaSize is present in the selectable items of PageMediaSize, the processing is ended because the setting is correct, and, in a case in which it is determined that it is not present, the processing from step S2505 to step S2506 is performed in order to change it into a valid setting.

In step S2505, the print setting editing module 211 changes the setting value of PageOutputMediaSize to the default setting. In step S2506, the print setting editing module 211 adds, as ScoredPropertys, the Width and the Height corresponding to the changed setting. For example, if the default value is A4, A4 is set in step S2505, and a parameter corresponding to the width of A4 and a parameter corresponding to the height of A4 are set in step S2506. As a result, it is possible to change the PageOutputMediaSize to a valid value in the case where setting indicating an added size in the PageOutputMediaSize is being performed but information indicating an actual form is improper.

As described above, in the present embodiment, an item indicating an added item is defined in advance in the print setting definition file. Then, in a case in which an added item is to be set, by setting the aforementioned item in conjunction with a parameter, it becomes possible to add a selection item later in an arbitrary setting during print settings for a V4 printer driver.

Also, an item corresponding to any number of added items is defined in advance in the print setting definition file. Then, in the case in which it is desired that an added item be set, it is possible to handle any number of item additions by setting in conjunction with a parameter indicating the aforementioned item and actual form. Note that while an example of adding a sheet size is described in the present embodiment, the present embodiment is not something that is limited to addition of a sheet size, and may be applied to any setting.

Note that description is given of each flowchart of the second embodiment in conformity with an embodiment that a user actually uses.

In the case in which the user prints a document, a print setting is performed by using a printer extension. The printer extension requests to the configuration module for generation of the PrintCapabilities. Upon receiving the request, the configuration module creates the PrintCapabilities. Furthermore, the processing of FIG. 20 starts upon the PrintCapabilities, which is generated by the configuration module being passed to the print setting editing module 211. At this stage, No is determined in step S2007, and step S2008 is executed.

The printer extension obtains (step S2201) the PrintCapabilities generated via the processing of FIG. 20, and executes step S2202 of FIG. 22. Consequently, for both the input sheet size and the output sheet size, a setting screen in which Letter, A4, UserForm0001, and UserForm0002 can be selected is displayed by the printer extension. The user selects the input sheet size and the output sheet size by using the setting screen. Here, a description is given envisioning a case in which in a user sets UserForm0001 in both the input sheet size and the output sheet size. In a case in which the user set UserForm0001, UserForm0001 is set for the value related to the input sheet size of the print ticket. Meanwhile, UserForm0001 is set in PageAddMediaSize, which is related to the output sheet size, but as described above in the paragraph 0121, AddSize is set in the PageOutputMediaSize.

After the print ticket is generated by the user operation described above, once again, the printer extension requests to the configuration module for PrintCapabilities generation. Then, the processing of FIG. 20 by the print setting editing module 211 is executed once again. In such a case, since UserForm0001 is present in the PageMediaSize in the PageAddMediaSize of the print ticket, Yes is determined in step S2007, and step S2009 is executed.

Next, in the case in which the user instructed print execution, the printer driver executes the processing of FIG. 23-FIG. 25. As described above, in the present embodiment, AddSize is set in the PageOutputMediaSize. Accordingly, in step S2405, Yes is determined. Furthermore, because UserForm0001, which is the setting value of PageAddMediaSize, is present in the PageMediaSize of the PrintCapabilities, Yes is determined in the processing for determining of step S2406. Then, in step S2409, the width and the height of the PageMediaSize of the PrintCapabilities are obtained, and the width and height are set as parameters of AddSize of the PrintTicket. Since the parameters that the user desires are set in an item called AddSize by this processing, the printing that the user intends is executed. Note that the above described processing procedure is only one example, and execution may be in another order.

Third Embodiment

Different methods of solving the problem to be solved, which is to be able to later add a selectable item of a particular function in the V4 printer driver, are presented in the first embodiment and in the second embodiment. These are not things that can respectively only be used independently, and a configuration may also be taken so as to use methods appropriate for each function together in one printer driver. For example, as exemplified in the respective embodiments, a configuration may also be taken to use the method of the first embodiment in relation to adding types of sheets and to use the method of the second embodiment for adding sheet sizes.

OTHER EMBODIMENT

Note that, in the first and second embodiments, a description is given using information related to sheets as one example, but as a matter of course, it is possible to apply the first and second embodiments to information that is different to sheets.

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
(A) a memory that stores instructions; and
(B) one or more processors that execute the instructions stored in the memory to cause the information processing apparatus:
   (a) to obtain a print setting definition file of a printer driver in which a setting item, a first additional item, and a second additional item are described;
   (b) to obtain an additional function from a printing apparatus; and
   (c) to generate print function information in which the setting item, the first additional item, and the second additional item are described, based on the print setting definition file, wherein, in a case in which a first additional function, as the additional function, is obtained, the print function information is generated so that information regarding the first additional function is described in the first additional item, and an attribute indicating non-display is described in the second additional item, and wherein, in a case in which the first additional function and a second additional function, as the additional function, are obtained, the print function information is generated so that information regarding the first additional function is described in the first additional item, and information regarding the second additional function is described in the second additional item.

2. The information processing apparatus according to claim 1, wherein information regarding the additional function stored in a property bag is described in the print function information.

3. The information processing apparatus according to claim 1, wherein the additional function is adding a type of sheet.

4. The information processing apparatus according to claim 1, wherein the print function information is generated by a configuration module provided by an operating system (OS) of the information processing apparatus.

5. The information processing apparatus according to claim 1, wherein the printer driver is a Version 4 printer driver.

6. The information processing apparatus according to claim 1, wherein the one or more processors further execute the instructions to cause the information processing apparatus:
   (d) to display the setting item and the additional function as options on a setting screen, based on the print function information, which describes information regarding the first additional function in the first additional item and describes the attribute indicating non-display in the second additional item; and
   (e) to display the setting item, the first additional function, and the second additional function as options on the setting screen, based on the print function information, which describes information regarding the first additional function in the first additional item and describes information regarding the second additional function in the second additional item.

7. The information processing apparatus according to claim 1, wherein the print setting definition file is a Generic Printer Description (GPD) file.

8. A control method that is executed in an information processing apparatus, the method comprising:
   obtaining a print setting definition file of a printer driver in which a setting item, a first additional item, and a second additional item are described;
   obtaining an additional function from a printing apparatus; and
   generating print function information in which the setting item, the first additional item, and the second additional item are described, based on the print setting definition file, wherein, in a case in which a first additional function, as the additional function, is obtained, the print function information is generated so that information regarding the first additional function is described in the first additional item, and an attribute indicating non-display is described in the second additional item, and wherein, in a case in which the first additional function and a second additional function, as the additional function, are obtained, the print function information is generated so that information regarding the first additional function is described in the first additional item, and information regarding the second additional function is described in the second additional item.

9. The control method according to claim 8, wherein information regarding the additional function stored in a property bag is described in the print function information.

10. The control method according to claim 8, wherein the additional function is adding a type of sheet.

11. The control method according to claim 8, wherein the generation of the print function information is generated by a configuration module provided by an operating system (OS) of the information processing apparatus.

12. The control method according to claim 8, further comprising:
   displaying the setting item and the additional function as options on a setting screen, based on the print function information, which describes information regarding the first additional function in the first additional item and describes the attribute indicating non-display in the second additional item; and
   displaying the setting item, the first additional function, and the second additional function as options on the setting screen, based on the print function information, which describes information regarding the first additional function in the first additional item and describes information regarding the second additional function in the second additional item.

13. The control method according to claim 8, wherein the print setting definition file is a Generic Printer Description (GPD) file.

14. A non-transitory computer-readable storage medium storing a program for causing a computer to execute a control method comprising:

obtaining a print setting definition file of a printer driver in which a setting item, a first additional item, and a second additional item are described;

obtaining an additional function from a printing apparatus; and generating print function information in which the setting item, the first additional item, and the second additional item are described, based on the print setting definition file, wherein, in a case in which a first additional function, as the additional function, is obtained, the print function information is generated so that information regarding the first additional function is described in the first additional item, and an attribute indicating non-display is described in the second additional item, and wherein, in a case in which the first additional function and a second additional function, as the additional function, are obtained, the print function information is generated so that information regarding the first additional function is described in the first additional item, and information regarding the second additional function is described in the second additional item.

15. The non-transitory computer-readable storage medium according to claim 14, wherein information regarding the additional function stored in a property bag is described in the print function information.

16. The non-transitory computer-readable storage medium according to claim 14, wherein the additional function is adding a type of sheet.

17. The non-transitory computer-readable storage medium according to claim 14, wherein the generation of the print function information is generated by a configuration module provided by an operating system (OS) of the information processing apparatus.

18. The non-transitory computer-readable storage medium according to claim 14, wherein the control method further comprises:

displaying the setting item and the additional function as options on a setting screen, based on the print function information, which describes information regarding the first additional function in the first additional item and describes the attribute indicating non-display in the second additional item; and displaying the setting item, the first additional function, and the second additional function as options on the setting screen, based on the print function information, which describes information regarding the first additional function in the first additional item and describes information regarding the second additional function in the second additional item.

19. The non-transitory computer-readable storage medium according to claim 14, wherein the print setting definition file is a Generic Printer Description (GPD) file.

* * * * *